United States Patent
Enger et al.

(10) Patent No.: US 12,044,040 B2
(45) Date of Patent: Jul. 23, 2024

(54) CABLE LOCKOUT DEVICE

(71) Applicant: Brady Worldwide, Inc., Milwaukee, WI (US)

(72) Inventors: Andrew N. Enger, Muskego, WI (US); Gene Gladkov, Muskego, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 149 days.

(21) Appl. No.: 17/696,449

(22) Filed: Mar. 16, 2022

(65) Prior Publication Data
US 2022/0316240 A1  Oct. 6, 2022

Related U.S. Application Data

(60) Provisional application No. 63/235,499, filed on Aug. 20, 2021, provisional application No. 63/170,224, filed on Apr. 2, 2021.

(51) Int. Cl.
*E05B 67/38* (2006.01)
*E05B 67/00* (2006.01)
*F16G 11/10* (2006.01)
*F16G 11/14* (2006.01)

(52) U.S. Cl.
CPC .......... *E05B 67/383* (2013.01); *E05B 67/003* (2013.01); *F16G 11/106* (2013.01); *F16G 11/14* (2013.01)

(58) Field of Classification Search
CPC .... E05B 67/383; E05B 67/006; E05B 13/002; E05B 67/36; E05B 67/003; F16G 11/106; F16G 11/14
See application file for complete search history.

(56) References Cited

U.S. PATENT DOCUMENTS

| | | | | |
|---|---|---|---|---|
| 1,660,040 A | * | 2/1928 | Lehtonen | F16G 11/14 |
| | | | | 24/134 KB |
| 2,315,196 A | * | 3/1943 | Gallione | B65D 19/44 |
| | | | | 24/134 P |
| 2,607,095 A | * | 8/1952 | Maasdam | F16G 11/106 |
| | | | | 294/102.1 |
| 3,017,678 A | * | 1/1962 | Christensen | F16G 11/101 |
| | | | | 24/134 R |
| 3,765,061 A | * | 10/1973 | Nash | A43C 7/08 |
| | | | | 24/134 P |
| 3,776,586 A | * | 12/1973 | Ahlgren | F16G 11/106 |
| | | | | 294/102.1 |

(Continued)

*Primary Examiner* — Christine M Mills
*Assistant Examiner* — Faria F Ahmad
(74) *Attorney, Agent, or Firm* — Quarles & Brady LLP

(57) ABSTRACT

A cable lockout device includes a housing receiving a cable in which the cable forms a loop external to the housing. The housing has a passageway extending therethrough through which the cable extends and has a cable gripping location positioned along the passageway. The cable lockout device further includes a locking arm rotationally coupled to the housing that actuates a cleat or cam spaced from the axis of the locking arm, which cleat or cam can be brought towards another cleat or cam in the cable gripping location (upon closure) or away from the other cleat or cam (upon opening). In a closed position of the locking arm, the locking arm is lockable relative to the body to prevent movement of the locking arm back to the opened position without first unlocking the locking arm relative to the body.

20 Claims, 15 Drawing Sheets

(56) References Cited

U.S. PATENT DOCUMENTS

| | | | | |
|---|---|---|---|---|
| 4,747,631 | A * | 5/1988 | Loynes | F16G 11/14 292/307 R |
| 4,788,755 | A * | 12/1988 | Kasai | B65D 63/16 24/136 R |
| 4,807,333 | A * | 2/1989 | Boden | F16G 11/106 24/136 R |
| 4,878,270 | A * | 11/1989 | Westerkamp | F16G 11/04 24/132 R |
| 4,912,817 | A * | 4/1990 | Sandreid | F16G 11/101 24/132 R |
| 5,083,350 | A * | 1/1992 | Sandreid | F16G 11/106 24/68 CD |
| 5,222,776 | A * | 6/1993 | Georgopoulos | F16G 11/14 292/307 R |
| 5,517,835 | A * | 5/1996 | Smith | E05B 73/0005 D8/333 |
| 5,531,297 | A * | 7/1996 | Pipan | B66D 5/16 188/65.1 |
| 5,823,020 | A * | 10/1998 | Benda | E05B 67/003 24/132 R |
| 5,894,639 | A * | 4/1999 | Boden | F16G 11/106 24/115 M |
| 5,931,112 | A * | 8/1999 | Lacan | B63B 21/08 114/218 |
| 6,003,210 | A * | 12/1999 | Facey | F16G 11/106 24/130 |
| 6,058,574 | A * | 5/2000 | Facey | F16G 11/106 24/115 R |
| 6,115,889 | A * | 9/2000 | Mickelson | A01K 1/04 24/115 R |
| 6,505,384 | B1 * | 1/2003 | Renton | F16G 11/106 24/132 WL |
| 7,152,439 | B1 * | 12/2006 | Chang | E05B 37/025 24/134 P |
| 7,272,962 | B2 | 9/2007 | Benda et al. | |
| 7,293,438 | B2 | 11/2007 | Benda | |
| 7,337,504 | B1 * | 3/2008 | Casey | B63B 21/08 24/134 P |
| 8,528,370 | B2 * | 9/2013 | Yu | E05B 67/003 70/49 |
| 9,032,764 | B2 * | 5/2015 | Yeh | E05B 67/003 70/49 |
| 9,388,606 | B2 | 7/2016 | Garthe et al. | |
| 10,352,068 | B2 | 7/2019 | Hollis | |
| 11,346,426 | B1 * | 5/2022 | Glusker | F16G 11/06 |
| 2004/0048522 | A1 * | 3/2004 | Facey | F16G 11/106 439/783 |
| 2006/0042329 | A1 * | 3/2006 | Benda | F16G 11/106 70/58 |
| 2006/0174460 | A1 * | 8/2006 | Borsoi | F16G 11/106 24/712.5 |
| 2006/0196016 | A1 * | 9/2006 | Cai | F16G 11/106 24/136 R |
| 2007/0137003 | A1 * | 6/2007 | Zebe | A43C 7/04 24/134 P |
| 2007/0271738 | A1 * | 11/2007 | Yang | F16G 11/106 24/163 R |
| 2009/0172920 | A1 * | 7/2009 | Hullmann | F16G 11/106 24/135 R |
| 2011/0041569 | A1 * | 2/2011 | Yu | E05B 67/003 70/15 |
| 2012/0110791 | A1 * | 5/2012 | Giemza | F16G 11/106 24/136 R |
| 2012/0180267 | A1 * | 7/2012 | LeBeau | F16G 11/143 24/134 R |
| 2012/0311824 | A1 * | 12/2012 | Mulholland | F16G 11/106 24/301 |
| 2014/0000324 | A1 * | 1/2014 | Yeh | E05B 67/003 70/174 |
| 2014/0123439 | A1 * | 5/2014 | Bacon | F16G 11/04 24/134 KB |
| 2015/0361691 | A1 * | 12/2015 | Garthe | E05B 67/383 24/132 AA |
| 2016/0138675 | A1 * | 5/2016 | Chih | F16G 11/106 24/134 KB |
| 2016/0377150 | A1 * | 12/2016 | Simonson | F16G 11/106 24/68 A |
| 2017/0217546 | A1 * | 8/2017 | Yates | B63B 21/08 |
| 2018/0111664 | A1 * | 4/2018 | Strube | F16G 11/04 |
| 2018/0223567 | A1 * | 8/2018 | Hollis | E05B 73/0011 |
| 2019/0209878 | A1 * | 7/2019 | Newing | F16G 11/12 |
| 2019/0301567 | A1 * | 10/2019 | Moss | F16G 11/108 |
| 2019/0329098 | A1 * | 10/2019 | Anderson | A63B 29/02 |
| 2021/0078479 | A1 * | 3/2021 | Lopez | F16G 11/106 |
| 2021/0095741 | A1 * | 4/2021 | Fisher | F16G 11/106 |
| 2021/0123502 | A1 * | 4/2021 | Zitzmann | F16G 11/14 |
| 2021/0381277 | A1 * | 12/2021 | Enger | E05B 63/20 |
| 2022/0128121 | A1 * | 4/2022 | Reynolds | F16G 11/146 |
| 2022/0333668 | A1 * | 10/2022 | Piao | F16G 11/101 |
| 2023/0193978 | A1 * | 6/2023 | Enger | F16G 11/106 70/18 |

* cited by examiner

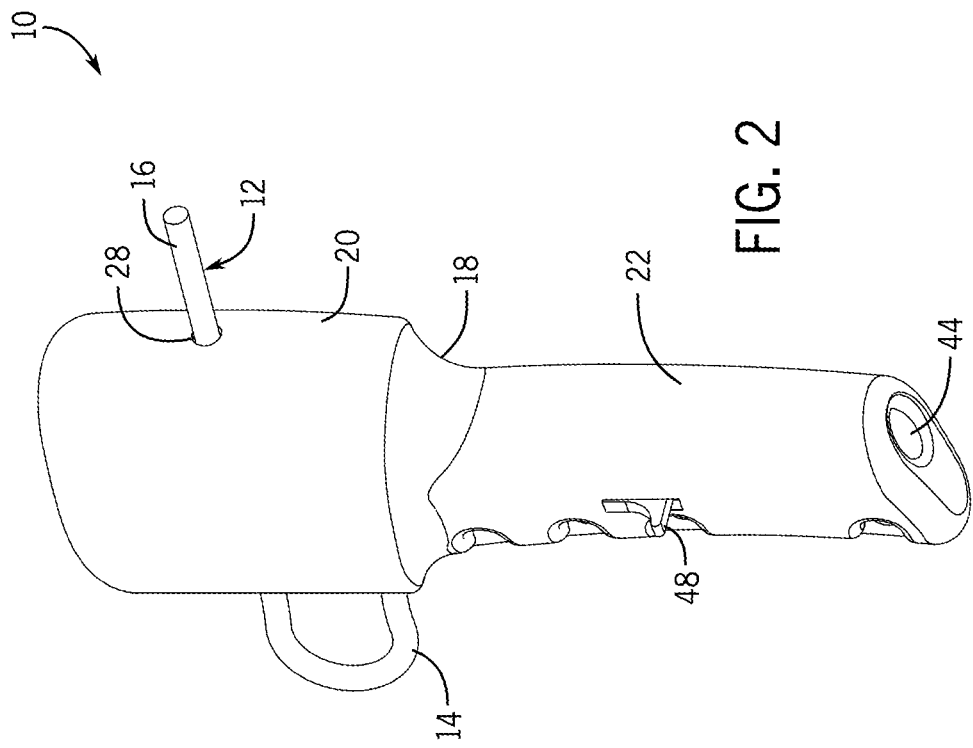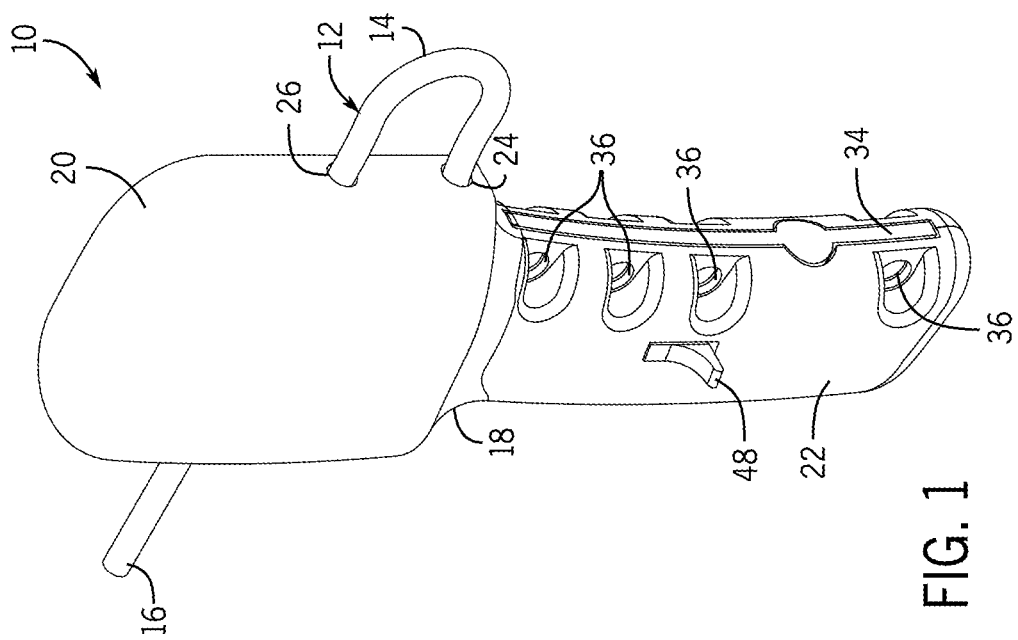

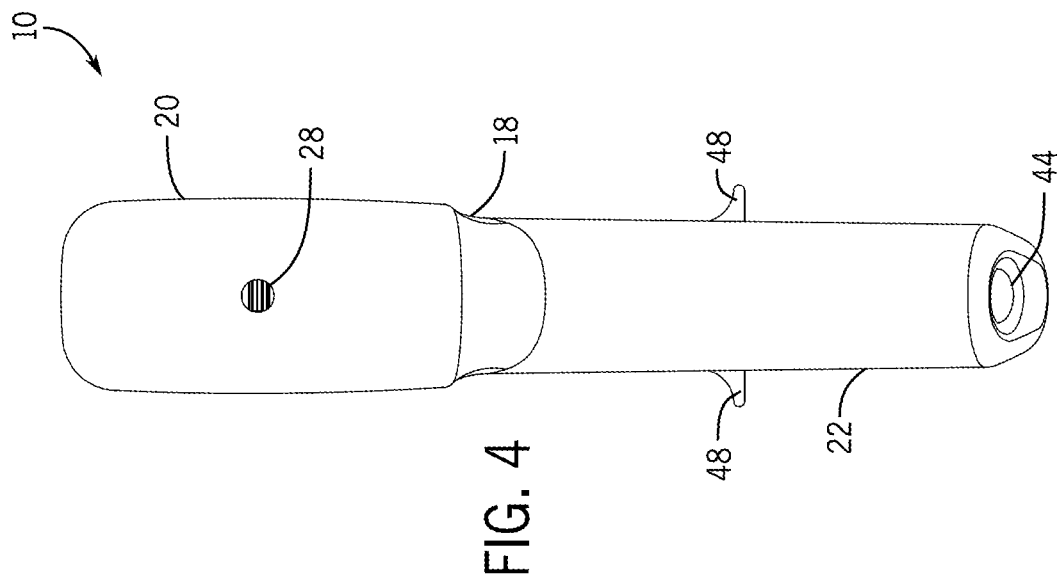
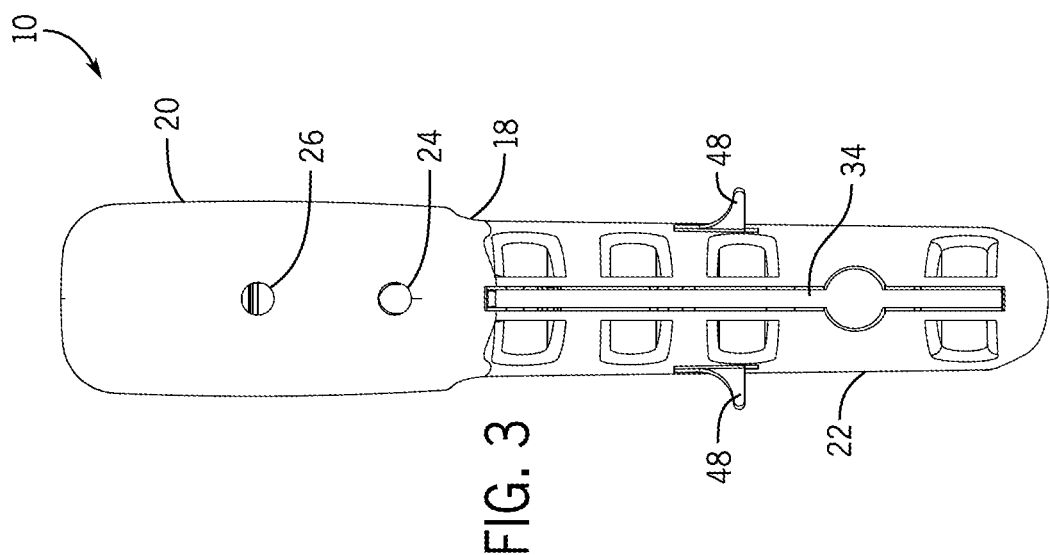

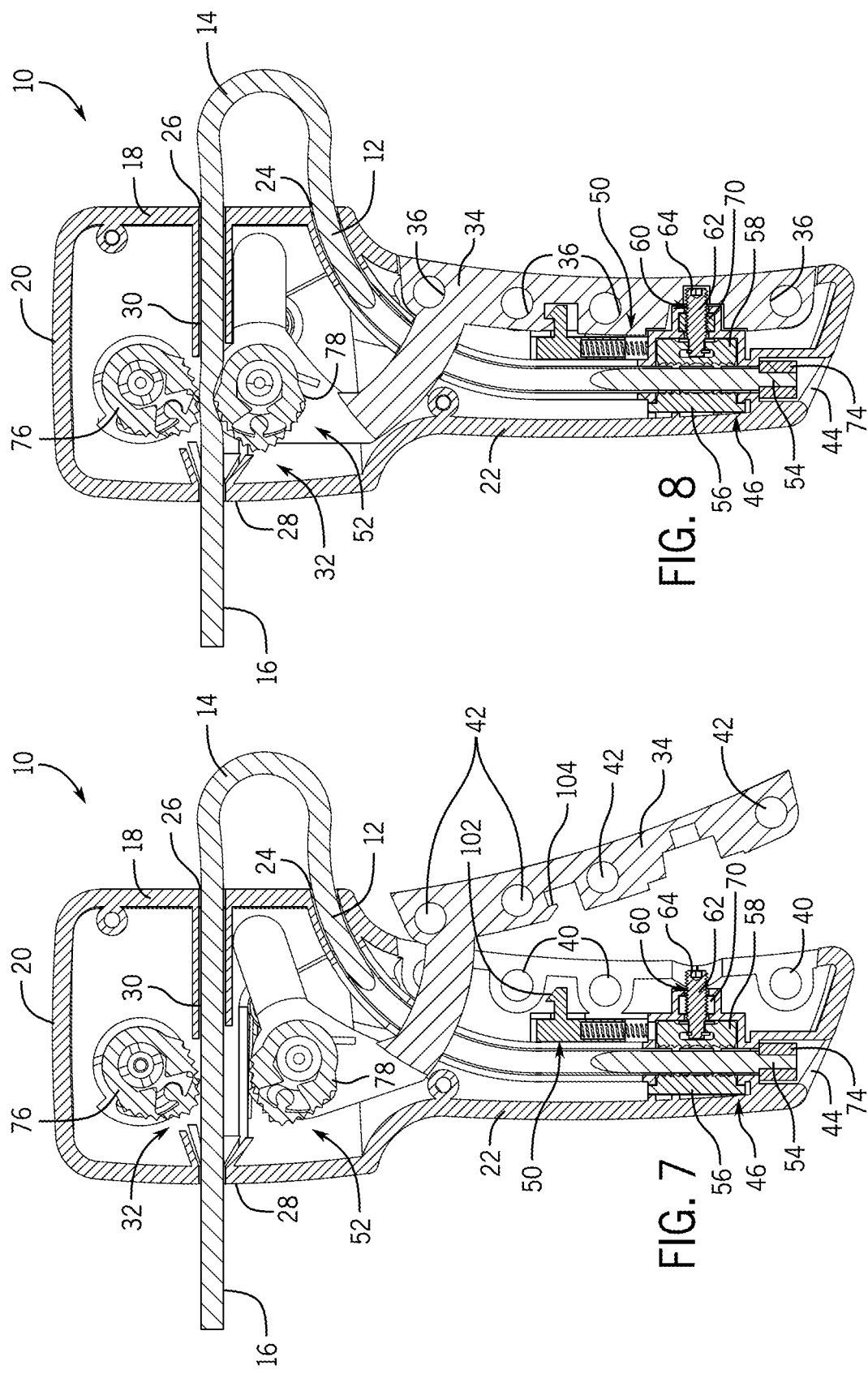

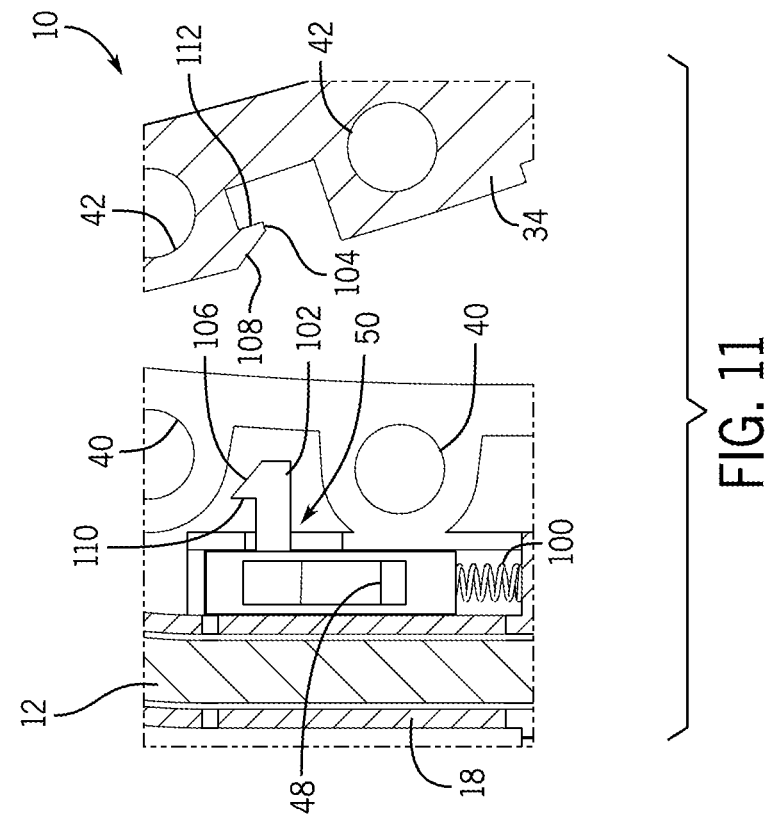
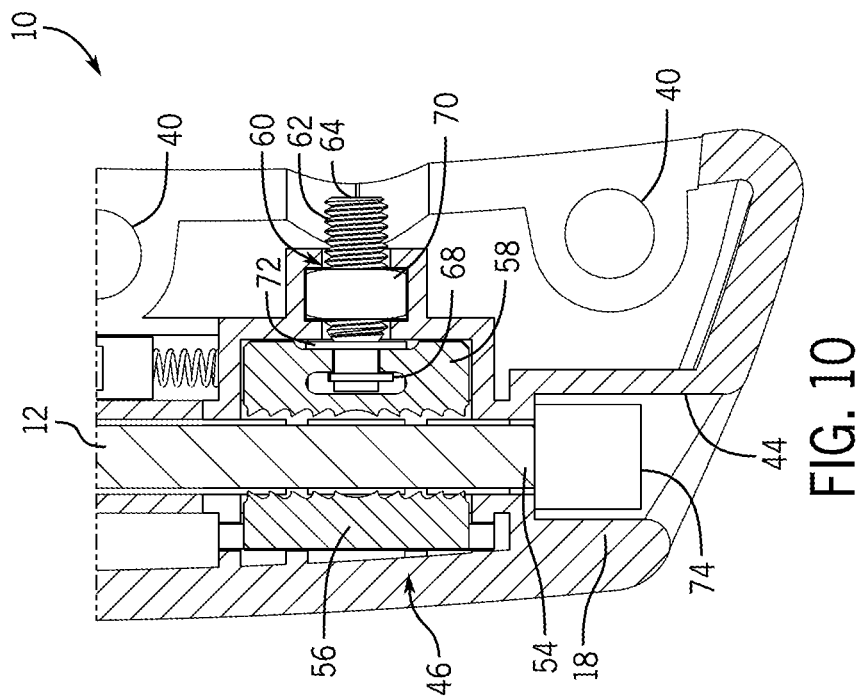

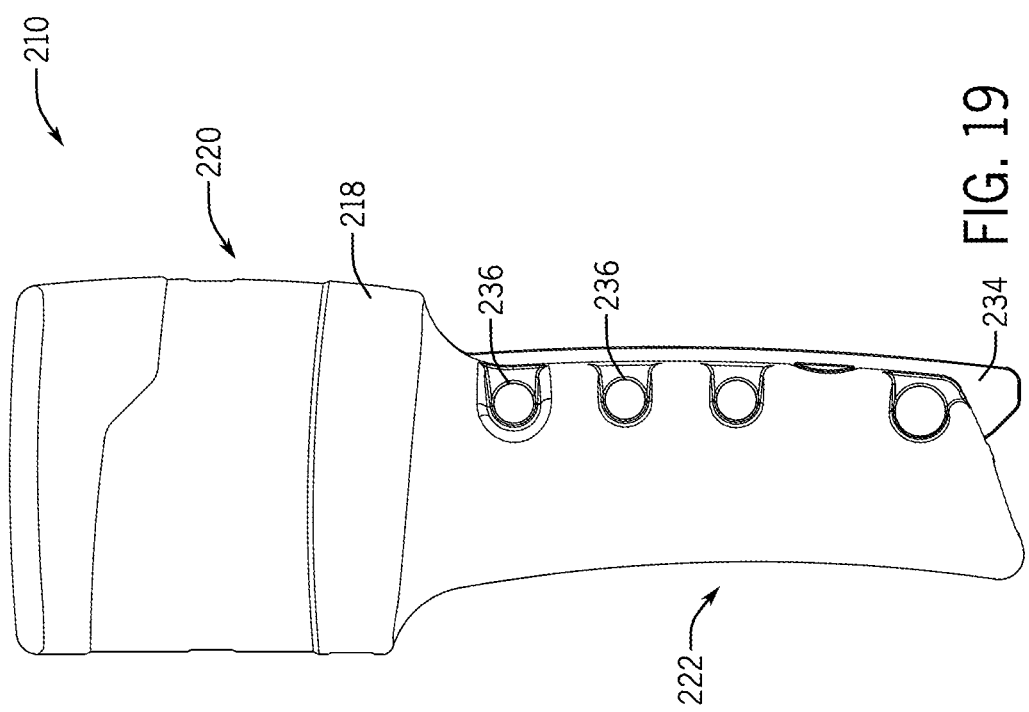

CABLE LOCKOUT DEVICE

CROSS-REFERENCE TO RELATED APPLICATION

This application claims the benefit of U.S. Provisional Patent Application No. 63/170,224 filed on Apr. 2, 2021, and of U.S. Provisional Patent Application No. 63/235,499 filed on Aug. 20, 2021, the contents of which are incorporated by reference in their entirety as if set forth herein.

TECHNICAL FIELD

This disclosure relates to a cable lockout device for securing a cable at various points to form a closed loop in order to secure a control.

BACKGROUND

Lockout devices are conventionally used to secure controls or energy isolation points during the maintenance or servicing of equipment. For instance, if a particular control or energy isolation point needs to be turned off to safely perform maintenance on equipment, then a lockout device may be installed on the control or the energy isolation point to physically prevent others from mistakenly turning that control back on until the work is complete. Such lockout devices often include the ability for multiple users to lockout a control simultaneously, for example, by permitting each user to attach their own separate padlock to the lockout device to secure the lockout device in place on the control. In such case, the lockout device cannot be removed and the control operated until all of the individual padlocks are removed from the lockout device.

One type of lockout device is a cable lockout device. These cable lockout devices are so named because they include a cable as part of the lockout device in which that cable can be run through the control and formed into a closed loop, with the closed loop preventing the operation of that control while the cable lockout device remains in place. An example of a cable lockout device can be found, for example, in U.S. Pat. No. 7,293,438 to Brady Worldwide, Inc., which is incorporated by reference herein. Such cable lockout devices can be well suited for locking out the rotatable spoked handles of valve controls, for instance, but may be used in other contexts as well.

SUMMARY

Because such cable lockout devices typically involve forming a closed loop to secure a control or an energy isolation point, they typically involve some variety of mechanism for securing the ends of the cable or a length of the cable in the central body of the lockout device. Many cable lockout devices pre-anchor one end of the cable in or to a housing with the free end of the cable being available for routing through the control to be locked out before being returned to the housing where that free end (or some portion of its length) is secured. Accordingly, these cable lockout devices often have some clamping or other securement mechanism for temporarily holding that free end or a length of the cable in place, which clamping or securement mechanism also needs itself to be lockable to prevent an unintended release of the cable.

However, providing a robust clamping or securement mechanism for the free end of the cable in the context of cable lockout devices has proven challenging. For one, it may be incumbent on the installer of the cable lockout device to hold the cable tight in order to keep the closed loop formed by the cable as small as possible while also applying a lock to the lockout mechanism, which can result in clumsy or awkward installation and/or increase the possibility that the loop formed once the free end is clamped down is slightly oversized, which may not fully prevent operation of the control being locked out. Moreover, where such clamping securement mechanism for the free end involves the user maintaining a manual clamping force to grip the cable until the lock has been applied to secure the clamping securement mechanism in place so the manual force can be removed, the installer may have to perform both the clamping action and the lock application actions simultaneously. Still further, yet another complicating factor is that many cable lockout devices have been designed to accommodate the use of cables of different diameters or of different materials, meaning that the clamping or securement mechanism may also need to be able to secure cables having a range of physical properties.

Disclosed herein is an improved cable lockout device. This cable lockout device incorporates a unique locking arm design in which the locking arm carries a cam or cleat which is moveable towards another cam or cleat at a cable gripping location. When brought together, these two cams/cleats can accommodate various cable diameters as well as provide the ability for the one-way movement of the cable through a cable passageway to permit the reduction of the loop size of the cable without permitting the cable to move in a counter direction that would enlarge the loop until the locking arm is released.

The improved cable lockout device also can incorporate a cable attaching mechanism that permits the cable to be replaced by cables of different diameters or materials as well as offers the ability for the locking arm, when closed, to block access to the cable attaching mechanism. In this way, the fixed end of the cable can be released and the cable potentially replaced with another cable, but not when the locking arm is secured or locked in place such as would be the case during lockout use when such release of the fixed end could potentially defeat the lockout function of the device.

The improved lockout devices also can include a locking arm release control. This locking arm release control can releasably retain the locking arm in the closed position, even when a lock (for example, a padlock) has not yet been on the locking arm. This permits the installer of the lockout device to keep the locking arm in the closed position while applying an initial lock without having to separately grip the locking arm into the closed position. This can prevent the locking arm from opening back up during installation, which may have the effect of permitting the cable to slip before it is secured by the cams or cleats. It can also prevent the locking arm from popping back open immediately after any padlocks are removed, so that the user has greater control over the release and removal of the cable lockout device from the control.

According to one aspect, a cable lockout device is provided including a cable and a housing receiving the cable in which the cable is capable of forming a loop external to the housing. The housing has a passageway extending through it through which the cable extends and further has a cable gripping location positioned along the passageway. At the cable gripping location, a first cleat is supported by the housing and has a first cleat axis that is fixed with respect to the housing. The cable lockout device further includes a locking arm rotationally coupled to the housing about a locking arm rotational axis. The locking arm is movable between an open position and a closed position in which, in the closed position, the locking arm is lockable relative to the body to prevent movement of the locking arm back to the opened position without first unlocking the locking arm relative to the body. The locking arm actuates a second cleat that is a cam, the second cleat having a second cleat rotational axis spaced from the locking arm rotational axis and which second cleat rotational axis is movable with respect to the housing by virtue of a movement of the locking arm. When the locking arm is moved to the closed position of the locking arm, the second cleat is brought towards the first cleat at the cable gripping location (so as to permit gripping of the cable). When the locking arm is moved to the opened position, the second cleat is moved away from the first cleat (so as to permit release of the cable).

In some forms, the housing may include a plurality of housing locking openings and the locking arm may include a plurality of arm locking openings. The housing locking openings and the arm locking openings may be aligned with one another in the closed position of the locking arm relative to the housing. The housing locking openings and the arm locking openings may be sized to receive shackles of padlocks through them, when the openings are aligned, to lock locking arm in the closed position.

In some forms, the second cleat or cam may be rotationally biased about the second rotational axis and each of the first cleat and the second cleat may include gripping teeth. Then, in the closed position of the locking arm, the cable may be gripped by the first cleat and the second cleat in the cable gripping location and may be prevented from being pulled in a direction that would enlarge the loop external to the housing. Even so gripped by the cleats, when the locking arm is in the closed position, the cable may still be able to be pulled through the cable gripping location in a direction that would decrease a size of the loop external to the housing.

In some forms, the cable lockout device may further include a cable attaching mechanism within the housing configured to clamp down on a fixed end of the cable in the housing. In one particular form, the cable attaching mechanism may be received in the housing and can include a fixed plate and a clamping plate that can be brought together by tightening a fastener or driver to clamp down on the cable. The cable attaching mechanism may permit for a replacement of the cable in the cable lockout device with another cable, including another cable with a different diameter or made from a different material than the cable originally in the cable lockout device. In some forms of the device, in the closed position the locking arm the cable attaching mechanism may not be accessible (for example, may be blocked by the closed position of the locking arm) and therefore cannot be operated to release the fixed end of the cable in the housing until the locking arm is opened.

In some forms, the cable attaching mechanism may take another form in which the cable attaching mechanism is received in the housing and includes a clamp block and a set screw. The clamp block may include a cable passage running through the clamp block and a threaded passage running perpendicular and intersecting with the cable passage. The set screw can be received in threaded passage of the clamp block. The set screw may be advanced or withdrawn along the threaded passage to selectively bring a cup point end of the set screw into engagement with the cable in the cable passage of the clamp block to secure the cable in place or to release the cable from the clamp block.

In some forms, the cable lockout device may further include a locking arm release control which releasably retains the locking arm in the closed position. The locking arm release control may be supported by the housing (for example, the housing may form a track for the locking arm release control) and the locking arm release control may include an engagement feature moveable between a retention position and a release position. The locking arm release control may further include a biasing element biasing the engagement feature to the retention position but against which biasing force the engagement feature is movable to be placed in the release position. The engagement feature may be structured to selectively engage a corresponding engagement feature on the locking arm when the locking arm is in the closed position in order to retain the locking arm in the closed position. When engaged, the engagement feature supported by the housing and the corresponding engagement feature on the locking arm may be disengaged from one another by actuation of the engagement feature from the retention position to the release position. In some forms, one or both of the engagement feature supported by the housing and the corresponding engagement feature on the locking arm can include an angled surface such that, as the locking arm is moved from the opened position to the closed position, the engagement feature supported by the housing and the corresponding engagement feature on the locking arm contact one another at the angled surface to effectuate displacement of the engagement feature from the retention position toward the release position against the biasing element until the locking arm is in the closed position, at which point the engagement feature can return or snap back to the retention position and the engagement feature and the corresponding engagement feature engage with one another.

In some forms, the housing may include a head and a handle. The head may have the cable gripping location positioned in it and the locking arm may be received in the handle when the handle is moved to the closed position.

In some forms, a first cleat rotational axis of the first cleat and the second cleat rotational axis may be parallel with one another and the first cleat and second cleat are rotationally biased in opposite directions about their respective axes to create a pinching action for the cable between them in the cable gripping location.

In some forms, the first cleat may be fixed with respect to the housing such that the first cleat does not pivot or rotate relative to the housing.

In some forms, the cable lockout device may further include a locking slide arm to which the second cleat or cam is attached. The locking slide arm may be movable (e.g., linearly translatable) toward and away from the cable gripping location positioned along the passageway by engagement of the locking slide arm with the locking arm. The locking slide arm may be biased away from the cable gripping location and, when the locking arm is in the closed position, the engagement of the locking arm with the locking slide arm can move the locking slide arm toward the cable gripping location, overcoming any biasing force applied to the locking slide arm. The locking arm may have an engagement surface that engages the locking slide arm to push the locking slide arm between a disengaged cleat position and an engaged cleat position.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 1 is a front, left, top perspective view of the cable lockout device with a cable received therein.

FIG. 2 is a rear, right, bottom perspective view of the cable lockout device of FIG. 1.

FIG. 3 is a front view of the cable lockout device of FIG. 1 without the cable installed.

FIG. 4 is a rear view of the cable lockout device of FIG. 3.

FIG. 7 is a left side cross-sectional view of the cable lockout device of FIG. 1, except in which the locking arm is in the opened position with the cleats or cams separated from one another.

FIG. 8 is a left side cross-sectional view of the cable lockout device of FIG. 1 similar to FIG. 7, but in which the locking arm has been moved to the closed position to illustrate the cleats or cams having been brought together at a cable gripping location.

FIG. 10 is a detailed left side cross-sectional view of a cable attaching mechanism within the cable lockout device illustrating how a fixed end of the cable can be secured in the housing.

FIG. 11 is a left side cross-sectional view of a locking arm release control in which the locking arm is in the opened position.

FIG. 19 is a right side view of the cable lockout device of FIG. 17 which, externally, is a mirror image of the left side view.

DETAILED DESCRIPTION

Figure 5:
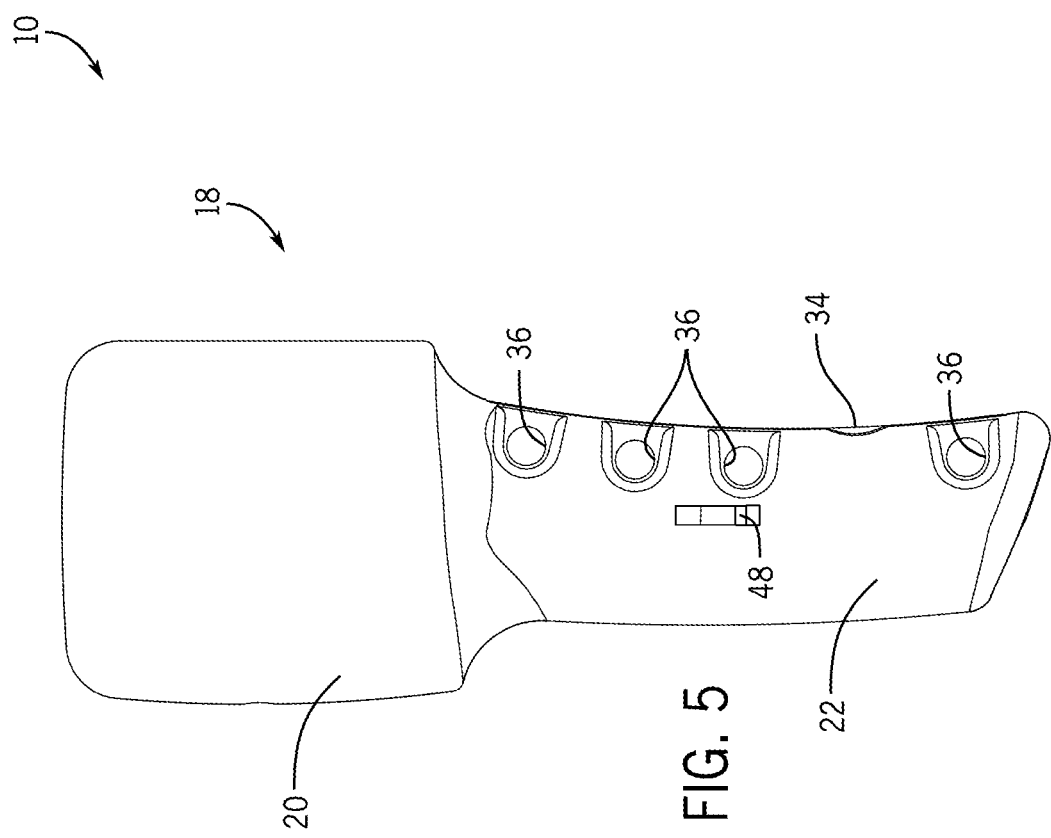
FIG. 5 is a left side view of the cable lockout device of FIG. 3 which, externally, is a mirror image of the right side view.

Referring first to FIGS. 1 through 5, a cable lockout device 10 is illustrated with a cable 12 in it in FIGS. 1 and 2 and without a cable in it in FIGS. 3 through 5. Such a cable lockout device 10 can be used to lockout controls such as valve handles by running the cable 12 through and between parts of the control and then forming a closed loop, such as loop 14 as depicted, which cannot be broken until the cable lockout device 10 is operated to permit a free end 16 of the cable 12 to be released such that the loop 14 may be opened and the device 10 removed from the control.

As specifically illustrated, the cable lockout device 10 includes both the cable 12 and a housing 18 receiving the cable 12. As depicted, the housing 18 has a head 20 and a handle 22.

The head 20 offers various openings for passage of the cable 12 including a pair of loop openings 24 and 26 on one side of the head 20 and a free-end opening 28 on the other side of the head 20. As will be described in greater detail below, the cable lockout device 10 can include a cable attaching mechanism internally which secures a fixed end of the cable 12 and the free end 16 of the cable 12 can then be routed out of one of the pair of loop openings 24 and back into the other of the pair of loop openings 26 to form the loop 14 relative to the housing 18 that can be used to lockout or secure a control during use of the cable lockout device 10. After being received in the loop opening 26, the free end 16 is routed through a passageway 30 in the head 20 (see, for example, FIGS. 6 through 8) and out the free-end opening 28 on the other side of the head 20. Although it cannot be seen in FIGS. 1 through 5, but can be seen in FIGS. 7 and 8, a cable gripping location 32 exists along this passageway 30 between the loop opening 26 and the free-end opening 28 which can serve to selectively prevent the enlargement of the loop 14 once the free end 16 of the cable 12 has been received back in the head 20 of the housing 18.

With respect to the handle 22 of the housing 18, the handle 22 is connected to the lower end of the head 20 and generally has a form that able to be gripped like the handle grip of a gun-like object or racquet. A locking arm 34, in FIGS. 1 through 5, is illustrated as being centrally received in the handle 22 of the housing 18 in the closed position of the locking arm 34, but which can be released to rotate outward to an opened position as illustrated in FIG. 7. As will be described in greater detail below, this locking arm 34 can be used to operate a mechanism at the cable gripping location 32 along the cable passageway 30 in the head 20 of the cable lockout mechanism 10 so as to, in selective situations, prevent the cable 12 from being moved in such a way as to permit the enlargement of the loop 14.

Figure 9:
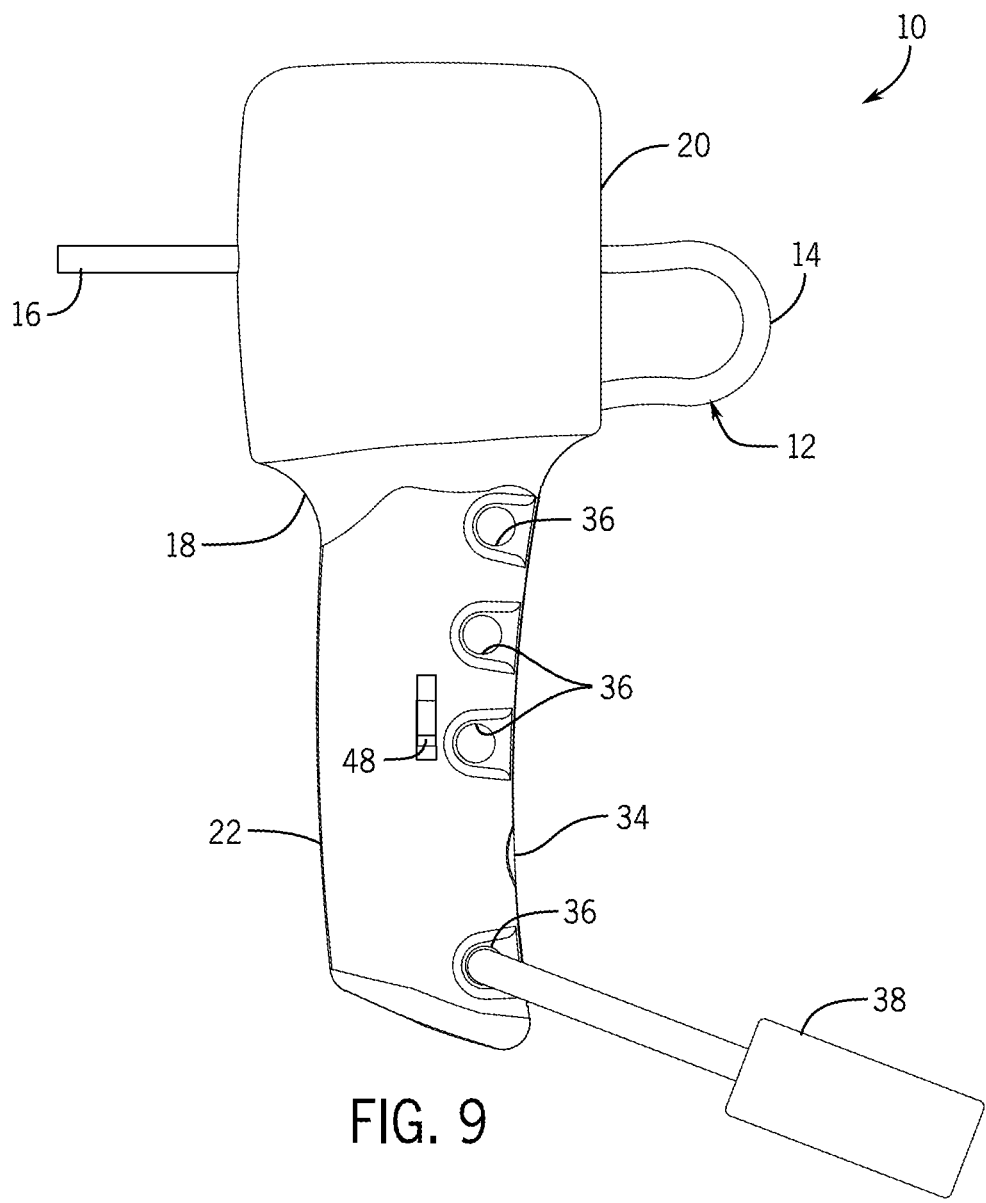
FIG. 9 is a left side view of the cable lockout device of FIG. 8 with a padlock attached to the housing and locking arm to secure the cable lockout device in the closed position.
Figure 12:
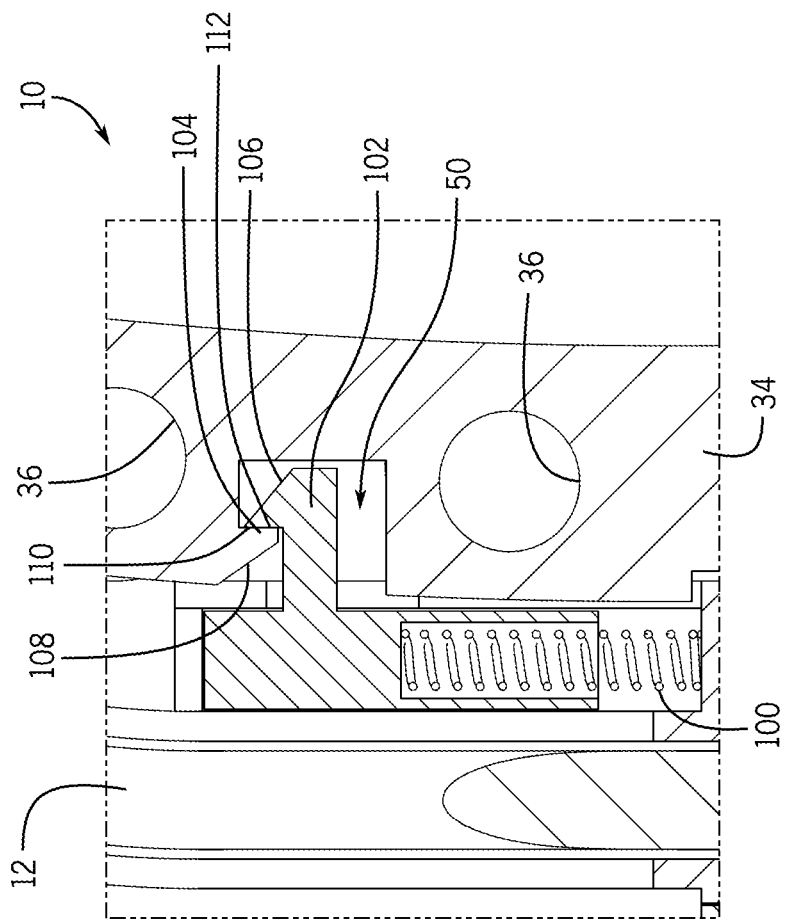
FIG. 12 is a left side cross-sectional view of a locking arm release control in which the locking arm is in the closed position showing the locking arm release control in the engaged position and holding the locking arm in the closed position.

As can be seen in FIGS. 1 and 5 as well as FIG. 8, when the locking arm 34 is in the closed position, the handle 22 includes aligned locking openings 36 which can receive a padlock such as a padlock 38 depicted in FIG. 9 to secure the locking arm 34 in the closed position for purposes of locking out the device 10. The aligned locking openings 36 are formed when the housing locking openings 40 align with the arm locking openings (seen separated in FIG. 7, for example) upon movement of the locking arm 34 to the closed position. As illustrated, there are four of the aligned locking openings 36 which are formed by corresponding pairs of the housing locking openings 40 and corresponding arm locking openings 42 sandwiched therebetween.

Additionally, as can be best seen in FIG. 2, the bottom side of the handle 22 includes a cable reception opening 44. The cable 12 (or other cables of different qualities, for example, cables made from different materials or having different diameters), can be received into the cable lockout device 10 or removed therefrom via the cable reception opening 44. Once a particular cable is inserted, this cable can be secured at a fixed end of the cable by a cable attaching mechanism 46 received in the handle 22 of the housing 18 as will be described in more detail below.

Lastly, with respect to the external features of the handle 22, tabs 48 of a locking arm release control 50 can be seen on the lateral sides of the handle 22. As will be described in greater detail below, the locking arm release control 50 can releasably retain the locking arm 34 in place with respect to the housing 18 in the closed position until the locking arm release control 50 is disengaged (in the illustrated embodiment, by moving the tab 48 downward relative to the housing 18). Thus, retention of the locking arm 34 in this closed position can be maintained by the locking arm release control 50, even without a padlock being in place in one of the aligned sets of locking openings 36.

Figure 6:
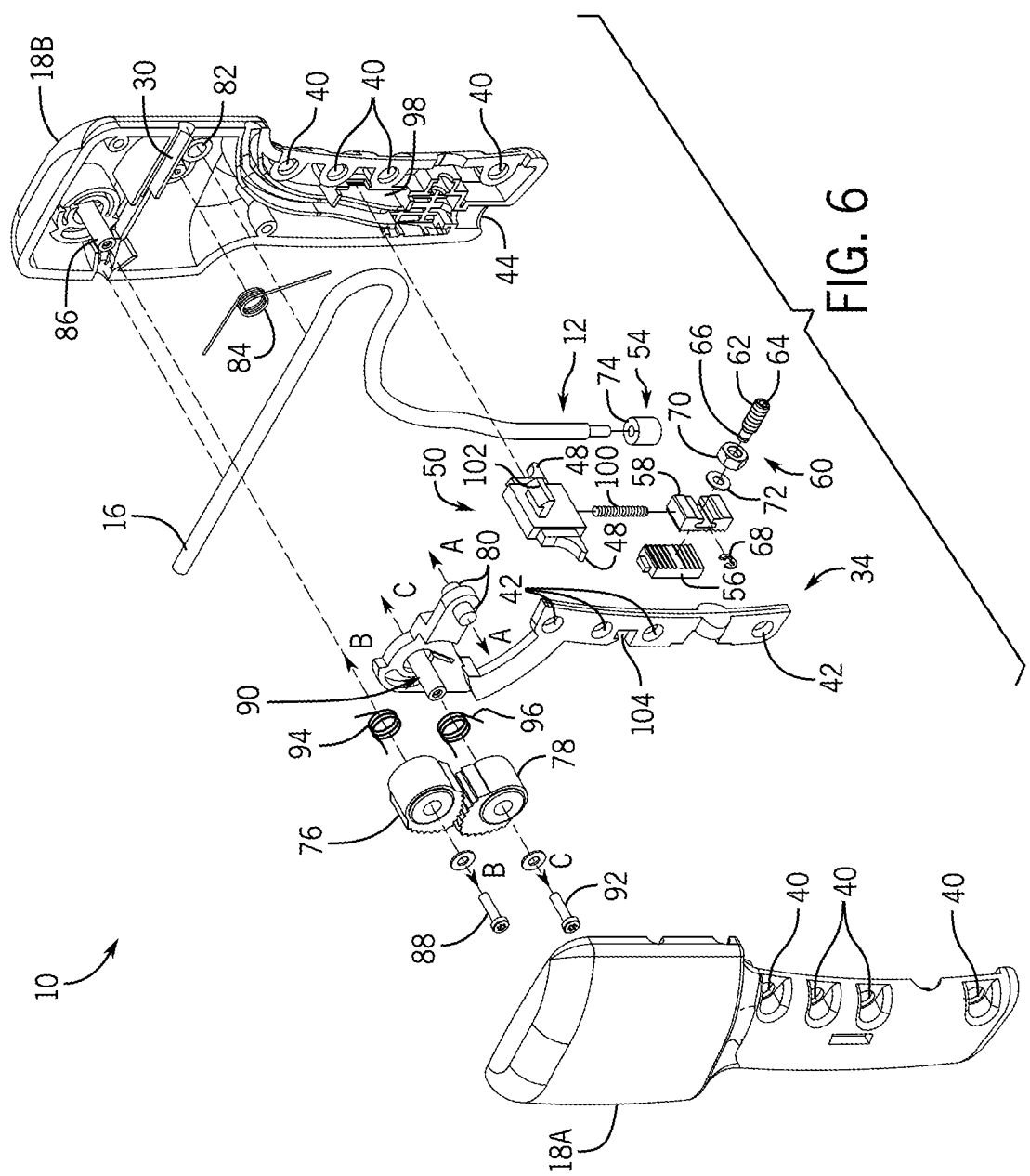
FIG. 6 is an exploded view of the cable lockout device of FIG. 1 showing the various internal components of the cable lockout device.

With the external features of the cable lockout device 10 having been generally described, reference is now made to FIG. 6 which illustrates in an exploded view the various components of the cable lockout device 10 including the internal components. Additional consideration of FIGS. 7 and 8 should made in conjunction with FIG. 6, to see how these internal components appear from the side when assembled.

Firstly, it can be seen in the exploded view of FIG. 6 that the housing 18 is bifurcated medially into two halves 18a and 18b, between which the internal components are received. At a high level, this housing 18 supports three mechanisms which have already been mentioned to some degree above including the cable attaching mechanism 46 for securing the fixed end 16 of the cable 12 in the housing 18; a cable gripping mechanism 52 for selectively gripping the cable 12 along the passageway 30 between one of the loop openings 26 and the free end opening 28 to prevent the loop 14 from being enlarged; and the locking arm release control 50 that can releasably hold the locking arm 34 in the closed position relative to the housing 18 even when the locking arm 34 is not secured by one or more padlocks. To improve understanding of how each mechanism is individually constructed, the function it performs, and how it contributes to the overall operation of the cable lockout device 10, each mechanism now will be separately introduced and discussed below, followed by an overall description of the operation of the device 10.

Cable Attaching Mechanism

Looking first at the cable attaching mechanism 46, the cable attaching mechanism 46 is configured to clamp down on a fixed end 54 of the cable 12 in the housing 18. The cable attaching mechanism 46 is captured between the two halves 18a and 18b of the housing 18 and, in the form illustrated, includes a fixed plate 56 and a clamping plate 58 that can be brought together by adjusting a driver or fastener 60 to clamp down on the cable 12. In this particular instance, the fastener 60 includes a threaded stud 62 having a head 64 at one end for reception of an Allen wrench or the like and a peripheral groove 66 at the other end for receiving a C-shaped washer 68. The fastener 60 also includes a hex nut 70 received along centrally along the threading of the threaded stud 62 and a washer 72.

As best seen in FIG. 10, the combination of the threaded stud 62, the C-shaped washer 68, and the washer 70 can be used to secure one end of the threaded stud 62 into a slot of the clamping plate 58 such that the clamping plate 58 travels with the axial displacement of the threaded stud 62. The hex nut 70 is also received in a cavity of the housing 18 which axially restricts the hex nut 70 and further prevents the nut 70 from rotating in the housing 18, effectively providing a threaded surface fixed in the housing 18. The threaded stud 62 can engage this threaded surface of the nut 70 and, upon rotation of the stud 62, the stud 62 can be axially displaced in either direction relative to the housing 18 to either draw the clamping plate 58 forward towards the fixed plate 56 or away from the fixed plate 56. In use, when the cable 12 is received in the cable reception opening 44, this cable attaching mechanism 46 can be used to keep one end of the cable 12 fixed.

Further and as can be seen in FIGS. 7 and 8, in particular, the fixed end 54 of the cable 12 can have an anchoring head 72 attached thereto that is slightly oversized relative to the cable reception opening 44.

During initial installation of the cable 12 into the housing 18, the free end 16 of the cable 12 is received in the cable attaching mechanism 46, the cable 12 can be pulled through until the anchoring head 74 becomes lodged at a step or decrease in diameter of the cable reception opening 44. This anchoring head 74 can generally locate the fixed end 54 relative to the cable attaching mechanism 46. To prevent unintended backward withdrawal of the cable 12 and further so that the securement of the anchoring head 74 to the cable 12 is not all that is keeping the cable 12 in place (since the connection between the anchoring head 74 and the cable 12 may not be totally structurally robust and, if broken without further cable support, could result in a closed loop 14 being permitted to open), the cable attaching mechanism 46 can be utilized to provide another and stronger attachment point for the cable 12. As best illustrated in FIGS. 8, 9, and 10, when the cable 12 is fully pulled through the cable attaching mechanism 46, the fixed plate 56 and the clamping plate 58 are disposed on opposing sides of the cable 12 and slightly open relative to the diameter of the cable 12. Upon initial placement of the fixed end 54 of the cable desired, the head 64 of the threaded stud 62 may be turned to advance the clamping plate 58 towards the fixed plate 56. Again, because the hex nut 70 is fixed in the housing 18 and the clamping plate 58 is secured on the other end of the stud 62, turning the threaded stud 62 can advance the clamping plate 58 (or, if turned in the opposite direction, retract the clamping plate 58). When a cable 12 is between the two plates 56 and 58 (which can have textured, knurled, or toothed surfaces), the cable 12 gets clamped or gripped to provide a point of securement within the handle 22 of the housing 18. Subsequently, if it is desired to free the fixed end 54 of the cable 12, the stud 62 may be rotated in the opposite direction to separate the plates 56 and 58 and release the cable 12.

It is additionally worth observing that the head 64 of the threaded stud 62 may be only accessible for adjustment of the cable attaching mechanism 46 in the illustrated embodiment when the locking arm 34 is in the opened position. When the locking arm 34 is in the closed position, the locking arm 34 may physically block access to the head 64 of the cable attaching mechanism 46 as can be seen in FIG. 8, preventing adjustment. One advantage of this is that, when the locking arm 34 is in the closed position, it is not possible to release the cable attaching mechanism 46, which might make it possible for the fixed end 54 of the cable 12 to be released or moved.

Figure 14:
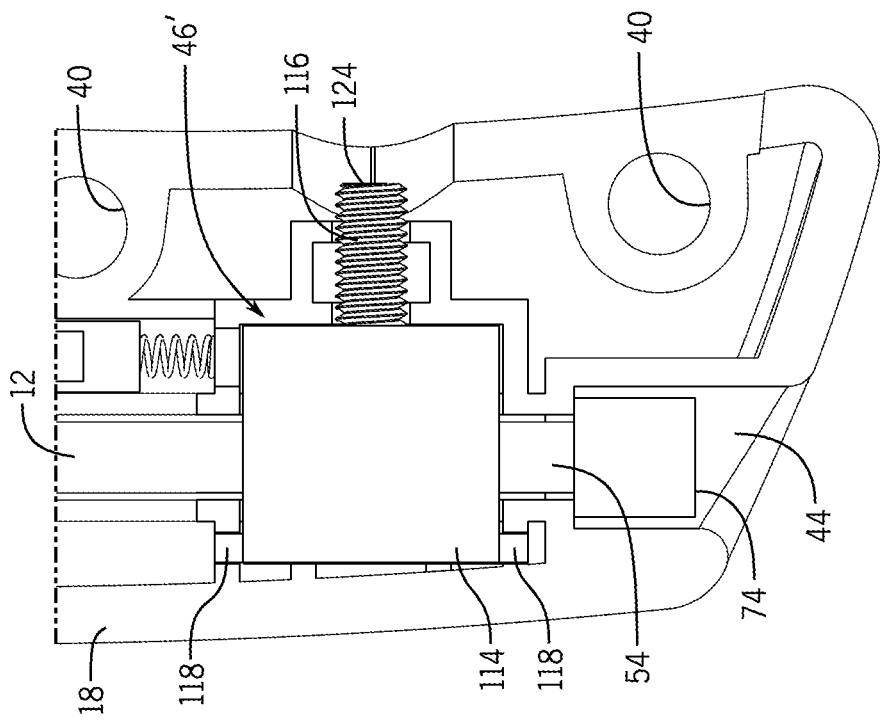
FIG. 14 is a detailed left side view similar to FIG. 13, but not in cross section, to illustrate that the clamp block is a single body receiving the set screw.
Figure 13:
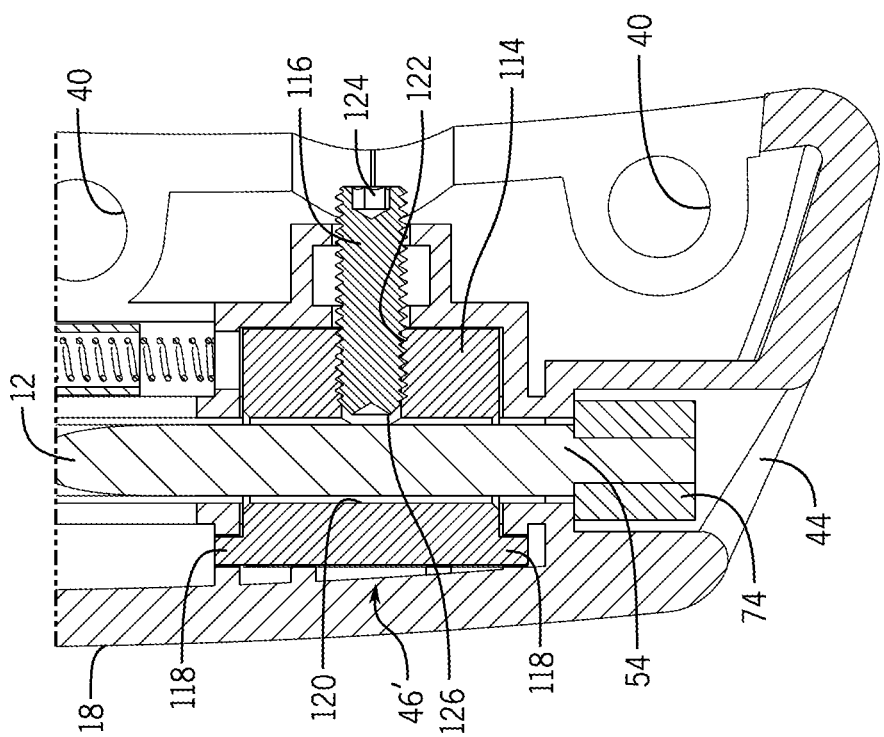
FIG. 13 is a detailed left side cross sectional view showing an alternative structure for the cable attaching mechanism in which the separate clamping plates configuration detailed in FIG. 9 is replaced with a cup point cable clamp configuration.
Figure 16:
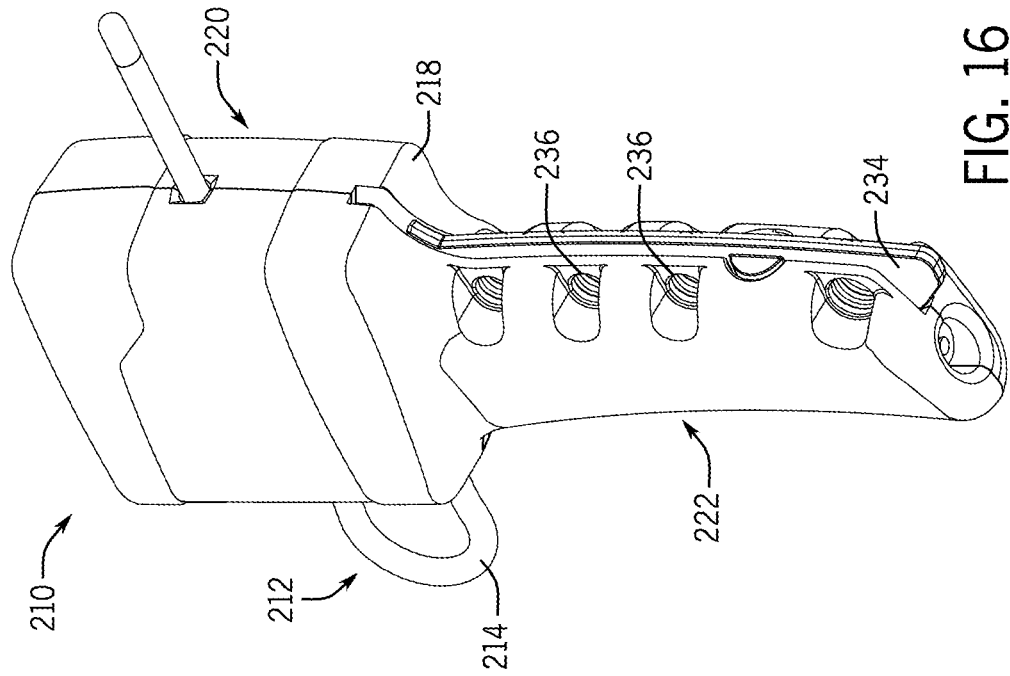
FIG. 16 is a rear, right, bottom perspective view of the second cable lockout device of FIG. 15.
Figure 15:
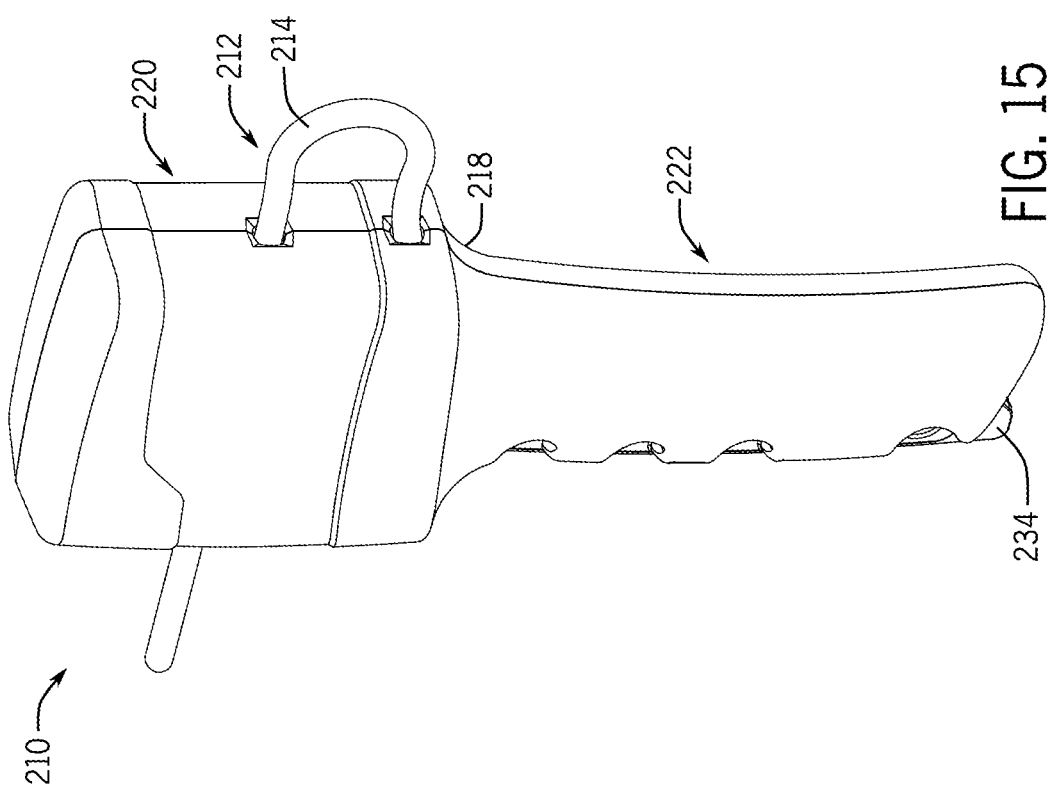
FIG. 15 is a front, left, top perspective view of another second cable lockout device with a cable received therein in which this cable lockout device differs from that of FIGS. 1-14 in both the internal cleat/cam actuation mechanism as well as the side of the cable lockout device on which the locking arm is located.
Figure 18:
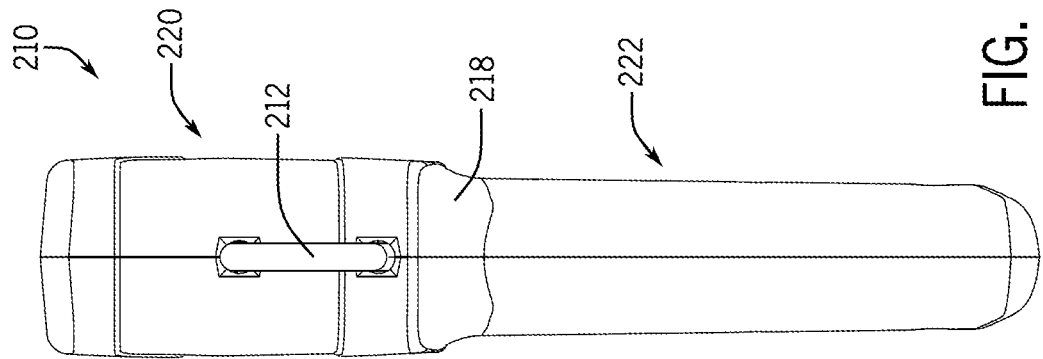
FIG. 18 is a front view of the cable lockout device of FIG. 17.
Figure 17:
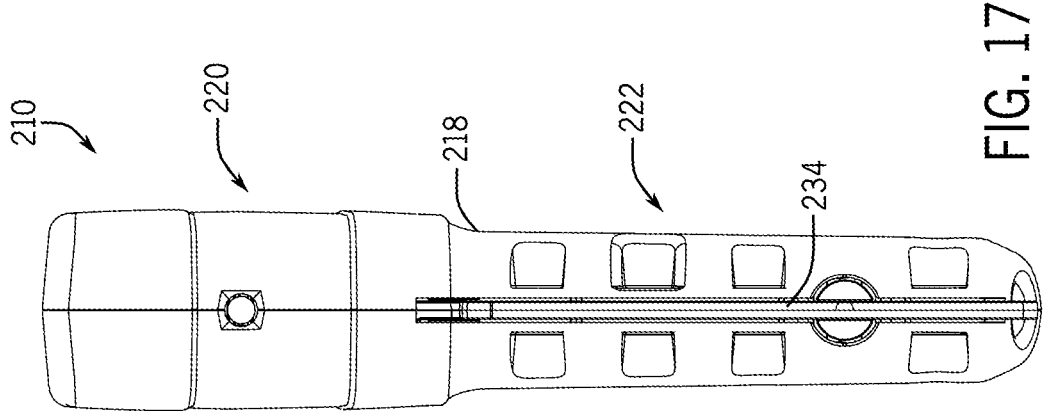
FIG. 17 is a rear view of the cable lockout device of FIG. 14 without the cable installed.
Figure 20:
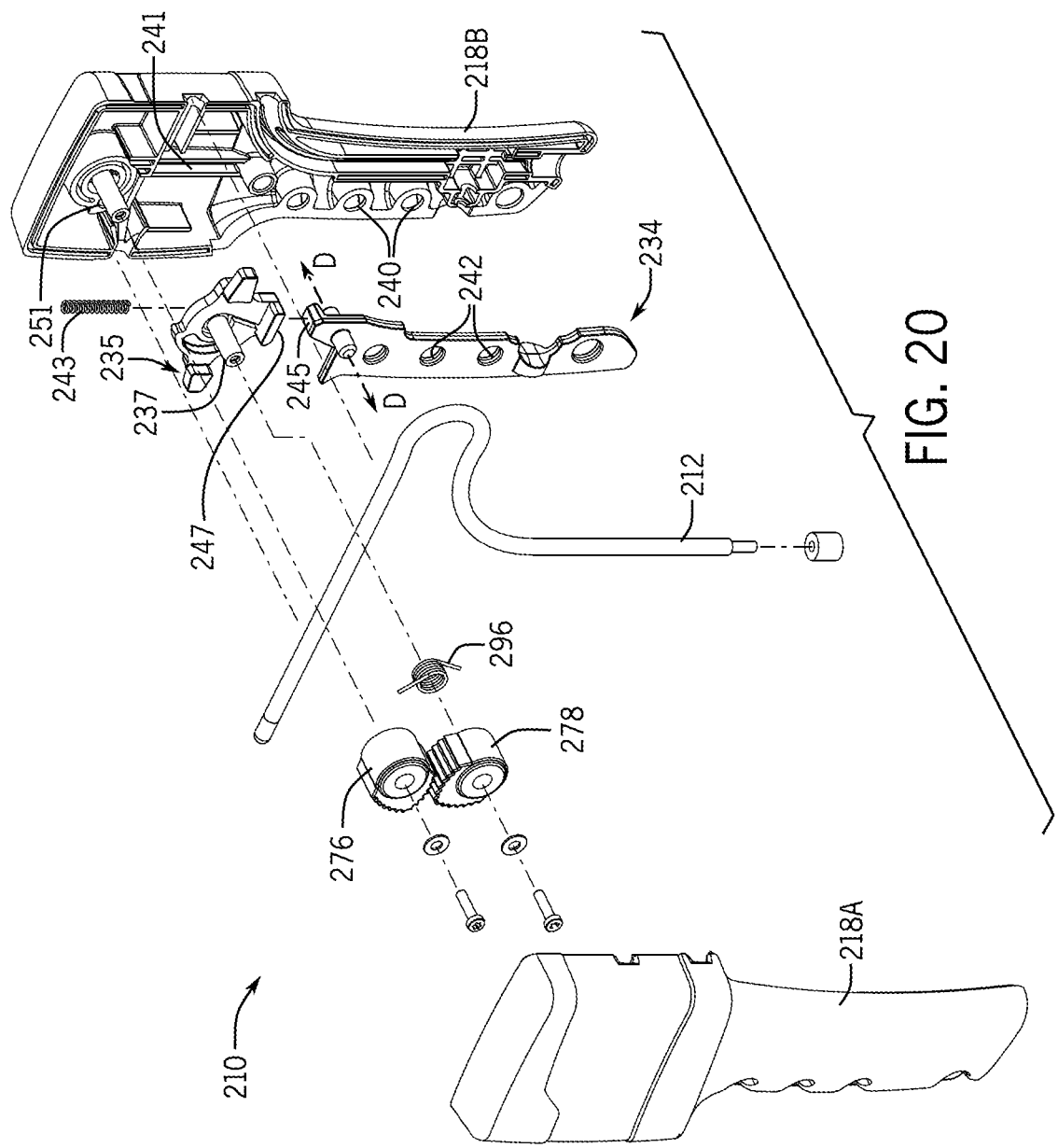
FIG. 20 is an exploded view of the cable lockout device of FIG. 15 showing the various internal components of the cable lockout device.

It will be appreciated that while one form of a cable attaching mechanism 46 has been illustrated, that other cable attaching mechanisms may also be used having different structures than the structure illustrated. For instance, in one alternative form, a block with a cup point set screw may be used to clamp down on the cable instead. Such an alternative structural configuration is illustrated in FIGS. 13 and 14, in which another cable attaching mechanism 46' is shown including a clamp block 114 and a cup point set screw 116. The clamp block 114 may have a set of fins 118 which may help position, fix, and secure the clamp block 114 relative to the housing 18. The clamp block 114 further includes a cable passage 120 that runs parallel to the path of the cable 12 and defines a portion of that cable path as well as further includes a threaded passage 122 which runs perpendicular to and intersects the cable passage 120. The threaded passage 122 receives the cup point set screw 116.

In this structural configuration of the cable attaching mechanism 46', once the cable 12 is received in the a cable passage 120 of the clamp block 114 at the desired position, the cup point set screw 116 may be turned at its head 124 by a wrench, screwdriver, or the like to cause the cup point 126 of the set screw 116 to be driven into the side of the cable 12 in the cable passage 120 by virtue of threaded engagement with the clamp block 114. As the cup point set screw 116 is threaded relative to the threaded passage 122 of the clamp block 114, the cup point 126 of the set screw 116 can advance, engage, and pinch the cable 12 against the side of the block 114 opposite the threaded passage 122 to clamp the cable 12 in place relative to the block 114 and, as the block 114 is secured in the housing 18, clamps the cable 12 relative to the housing 18.

One of the advantages of this structural configuration is that there are relatively few mechanical components for assembly as compared to the first described structural configuration with multiple clamp plates and components for attaching the screw/stud to the moving clamp plate. This alternative design can simplify construction and complexity of the device. Indeed, it might even be possible to further eliminate the clamp block 114, if the housing 18 itself is designed to act as one side of the clamp for the cable 12 and if the housing 18 includes or is provided with a threaded surface (e.g., by capturing a hex nut in the housing as described in the first configuration) to displace the set screw relative to the cable and opposing clamping surface.

Cable Gripping Mechanism

Turning now to the cable gripping mechanism 52, the cable gripping mechanism 52 includes a pair of cleats including a first cam 76 which is supported by the housing 18 at the cable gripping location 32 and a second cam 78 which is attached to and carried by the locking arm 34 and movable into and out of the cable gripping location 32. It will be appreciated that, in this first embodiment, both of the cleats are cams and are rotatable; however, as will be discussed in the second embodiment, it is contemplated that one of the cleats could be fixed and so may not be considered a cam in that it does not rotate, even if it has a shape suggestive of a cam. Looking at the first embodiment, both cams 76 and 78 are eccentric with an egg-shaped profile having gripping teeth on the surfaces furthest from their rotational centers for gripping the cable 12. The locking arm 34 itself is rotationally coupled to the housing 18 about a locking arm rotational axis A-A (shown in FIG. 6) and is movable between an open position (as in FIG. 7) and a closed position (as in FIG. 8). In the particular form illustrated, the locking arm 34 has posts 80 which are received into cylindrically-shaped recesses 82 in the housing 18 to define this locking arm rotational axis A-A, although such rotation or movement may be established using other structures. Still further, a spring clip/torsion spring 84 can be received between the housing 18 and the locking arm 34 so as to bias the locking arm 34 towards the opened position, but which biasing force may be overcome in use by the user to place the locking arm 34 in the closed position. While a purely rotational movement is illustrated of the locking arm 34, it is contemplated that, in some forms, the locking arm 34 could be made to rotate and/or translate in part in other ways to achieve a similar effect to that described below with respect to the operation of the cleats or cams 76 and 78 without employing the exact structure disclosed.

The cleats or cams 76 and 78 are designed to be brought together to grip the cable 12 in the cable gripping location 32 along the passageway 30 (or reversibly separated by separating the cleats or cams 76 and 78 from one another) by operation of the cable gripping mechanism 52 via movement of the locking arm 34 relative to the housing. It can be seen from FIG. 6 that the first cam 76 has a first cam rotational axis B-B that is fixed with respect to the housing 18 (as the first cam 76 is secured to a post 86 on the housing 18 by a securing element 88), while the second cam 78 has a second cam rotational axis C-C (as the second cam 78 is secured to a post 90 on the locking arm 34 by a securing element 92) in which the axis C-C is spaced or offset from the locking arm rotational axis A-A. Axes A-A, B-B, and C-C are spaced from one another, but are also parallel with one another. Accordingly, with this structure and arrangement, the axis C-C of the second cam 78 is movable with respect to the housing 18—and therefore the first cam rotational axis B-B which is fixed relative to the housing 18—by virtue of a movement of the locking arm 34. So, the rotational movement of the locking arm 34 can change the spacing between the first cam rotational axis B-B and the second cam rotational axis C-C based on the position of the locking arm 34 with respect to the housing 18. When the locking arm 34 is in the opened position of FIG. 7, the cams 76 and 78 are spaced from one another, whereas when the locking arm 34 is moved to the closed position of FIG. 8 (by swinging the cam 78 clockwise relative to the orientation of FIG. 8 on the page), the cams 76 and 78 are brought together and the distance between their axes of rotation B-B and C-C is reduced.

Apart from the ability to adjust the axial spacing of the cams 76 and 78 by movement of the locking arm 34, at least in the first embodiment, each of the cams 76 and 78 are rotationally biased about their own respective axes B-B and C-C so as to create a pinching action when they are brought together. This biasing is done by placing a biasing element or torsion spring 94 between the housing 18 and the first cam 76, and a biasing element or torsion spring 96 between second cam 78 and the locking arm 34. Rotational biasing of such elements using torsion springs is well known in the art, so further detail will be limited, but it is to be appreciated that the legs of the springs can interact with both the cams and the respective attached structure (whether the locking arm 34 or the housing 18) and, moreover, other structures or tracks can be provided between the cleats/cams and the housing or locking arm to establish a range of motion of the cleats/cams. As illustrated in FIGS. 7 and 8, the first cam 76 which is the upper cam is biased in a counterclockwise direction while the second cam 78 which is the lower cam is biased in a clockwise direction such that both of the elongated portions of the cams 76 and 78 bearing the gripping teeth would meet on the left side of the page proximate the side of the head 20 having the free-end opening 28. However, as is apparent from the second embodiment, not both of the cleats need to be rotatable cams and one of the cleats could be fixed, for example.

With this cable gripping mechanism 52 having been generally described, the functionality of this mechanism 52 can now be fully appreciated. In use and with locking arm 34 of the cable lockout device 10 in the opened position, the free end 16 of the cable 12 will be initially extended from loop opening 26 and threaded though some aspect of a control to be locked out. The free end 16 can then be received in the loop opening 26 and directed though the passageway 30 until the free end 16 has exited the housing 18 at the free-end opening 28. In can be seen in FIGS. 7 and 8, for example, how the inside of the housing 18 can have structures along the passageway 30 to help cleanly direct the free end 16 from the loop opening 26 to the free-end opening 28 and, in doing so, past the cable gripping location 32. With the locking arm 34 in the opened position and the cleats or cams 76 and 78 separated, the cable 12 is able to slide freely and unrestrictedly through the cable gripping location 32 in either direction to permit the loop 14 to be enlarged or shrunk. Subsequently, the locking arm 34 can be moved from the opened position to the closed position to cause the second cam 78, which is carried by the locking arm 34, to be brought together with the first cam 76 on opposing sides of the cable 12 at the cable gripping location 32. As the second cam 78 is brought towards the first cam 76, both cams 76 and 78 may to some degree rotate about their own axis B-B or C-C to also account for a variance in diameter of the cable 12 while creating some engagement between the toothed sections of the cams 76 and 78 and the cable 12 (although it is again contemplated that one or more of the cams could instead be replaced with a fixed cleat and not be rotatable, as described in the second embodiment below). Once the locking arm 34 is in the closed position of FIG. 8 and is held or locked in place, these cleat or cams 76 and 78 prevent the movement of the cable 12 rightward on the page out the loop opening 26 (such that the loop 14 cannot be enlarged), but does permit the cable to be pulled leftward (to permit the loop 14 to be shrunk). Not until the locking arm 34 is released and moved to the opened position in which the cleats or cams 76 and 78 are separated, is the cable 12 able to freely move in that rightward direction on the page to permit the loop 14 to enlarge and potentially open so that the device 10 can be removed from the control being locked out.

Locking Arm Release Control

Lastly, the third mechanism and its components, the locking arm release control 50, will be described. When the locking arm 34 is moved into the closed position, this locking arm release control 50 can releasably retain the locking arm 34 in that closed position so as either to facilitate the arm 34 being held in place while one or more padlocks is/are attached to the aligned lock openings 36 or to prevent the arm 34 from immediately swinging open after any padlocks are removed.

With reference being made to FIGS. 6, 7, 8, 10, and 11, the locking arm release control 50 and its operation are now described. The locking arm release control 50 is received in a channel 98 formed in the handle 22 of the housing 18 and is translatable within that channel 98 between a retention position (illustrated in FIGS. 7, 8, 11, and 12) and a release position (not illustrated, but translated downwardly relative to the position shown in FIGS. 7, 8, 11, and 12). A biasing element 100 such as a compression spring urges the locking arm release control 50 upward to the retention position and can be overcome to downwardly displace the locking arm release control 50 to the release position.

In the form illustrated, the locking arm release control 50 includes the pair of tabs 48 on its lateral sides which extend through small slits on the walls of the handle 22 of the housing 18. This permits the user to press down on either of the tabs 48 to move the locking arm release control 50 from the retention position to the release position against the force of biasing element 100.

The locking arm release control 50 includes an engagement feature 102 that is structured to selectively engage a corresponding engagement feature 104 on the locking arm 34 when the locking arm 34 is in the closed position in order to retain the locking arm 34 in the closed position. In the form illustrated, the engagement feature 102 is a projection with an angled tooth that can engage an angled tooth feature formed as the corresponding engagement feature 104 on the locking arm 34. In such form as that depicted, when the locking arm 34 is brought from the opened position towards the closed position, the angled surfaces 106 and 108 of the engagement features 102 and 104 can engage one another to effectuate the movement of the locking arm release control 50 toward the release position until the closure results in the teeth moving past one another and the locking arm release control 50 and its associated engagement feature 102 snap back to the retention position. In this position, stop surfaces 110 and 112, respectively, of the engagement feature 102 and the corresponding engagement feature 104 prevent the locking arm 34 from being swung back open to the opened position until and unless the user has depressed the tabs 48 to cause the locking arm release control 50 and the engagement feature 102 to move back to the release position thereby disengaging the locking arm 34 from the housing 18.

Some of the advantages potentially offered by this locking arm release control 50 are that it can be used to maintain the locking arm 34 in the closed position without the user continuing to manually hold the locking arm 34. This can be beneficial in that it can make it easier to use one or more secure padlocks to then lockout the device 10 so that the locking arm 34 does not need to be held shut as the first padlock is attached. It also helps to ensure that the cable 12 continues to be gripped and held in placed by the cable gripping mechanism 52 while any padlocks are applied and prevents the loop 14 from inadvertently shifting to a slightly larger size during this padlock attachment process. It further enables the cable lockout device 10, upon removal of all padlocks, to not immediately snap back open until the user initiates the opening of the locking arm 34 by the depression of the tabs 48 to operate the locking arm release control 50.

Cable Lockout Device

Turning now to FIGS. 15 through 23, a second cable lockout device 210 is illustrated which again has a head 220, handle 222, and a cable 212 for forming a loop 214. This cable lockout device 210 is similar to the device 10 in general operation and construction with a few exceptions that will be apparent from the description that follows. For the sake of brevity and conciseness in description, not all similar features among the two illustrated embodiments will be specifically called out in the second embodiment of the cable lockout device 210, but those having ordinary skill in the art will appreciate that the structure and features of the device 10 that are present in device 210 even where not separately identified.

A first difference between the cable lockout device 10 and the cable lockout device 210 is that, in the cable lockout device 210, the locking arm 234 has been flipped from the front side to the rear side of the handle 222 of the device 210 relative to how it was positioned on the handle 22 the first device 10. This is perhaps most apparent when comparing FIGS. 1, 2, 7 and 8 of device 10 with FIGS. 15, 16, 22, and 23 of device 210. Given the manner in which the handle 22 or 222 is gripped, the alternative side positioning may make it more ergonomic to use the device 210 and apply the lock to secure the locking arm 234 relative to the housing 218. For example, whereas a user's four fingers might have been used in the first embodiment to pull the locking arm 34 back to the handle 22 such that the openings 36, 40, and 42 were on the front side of the handle 22, in the second embodiment the aligned locking openings 236 and the housing locking openings 240 and arm locking openings 242 are on the rear side of the handle 222 as is the locking arm 234. In this case, the locking arm 234 can be rotated and gripped by the user using the thumb and area between the thumb and pointer finger to actuate the locking arm 234 toward the handle 222. Based on the comparative gripping patterns and with this different structure, this leaves more available space on the rear thumb side for the user to attach a lock to the aligned locking openings 236 in the second embodiment (since the four fingers to not block the openings 36 as might be the case in the first embodiment). Further since the rear side will face the user based on the grip, this can also make it easier to apply or remove the lock on the side more readily viewable to the holder/user.

A second difference between the cable lockout device 10 and the cable lockout device 210 is that, in the cable lockout device 210 has no locking arm release control 50 as was present in the cable lockout device 10. This means that, while there is not a mechanism to hold the locking arm 234 in the closed position without the lock in the device 210 (other than the user's grip), there are also not protruding tabs 48 in the second embodiment. The lack of protruding tabs 48 may make holding the handle 222 slightly easier and more ergonomic, since the user's fingers and palms do not need to navigate around anything such as tabs when the handle 22 is gripped.

Figure 21:
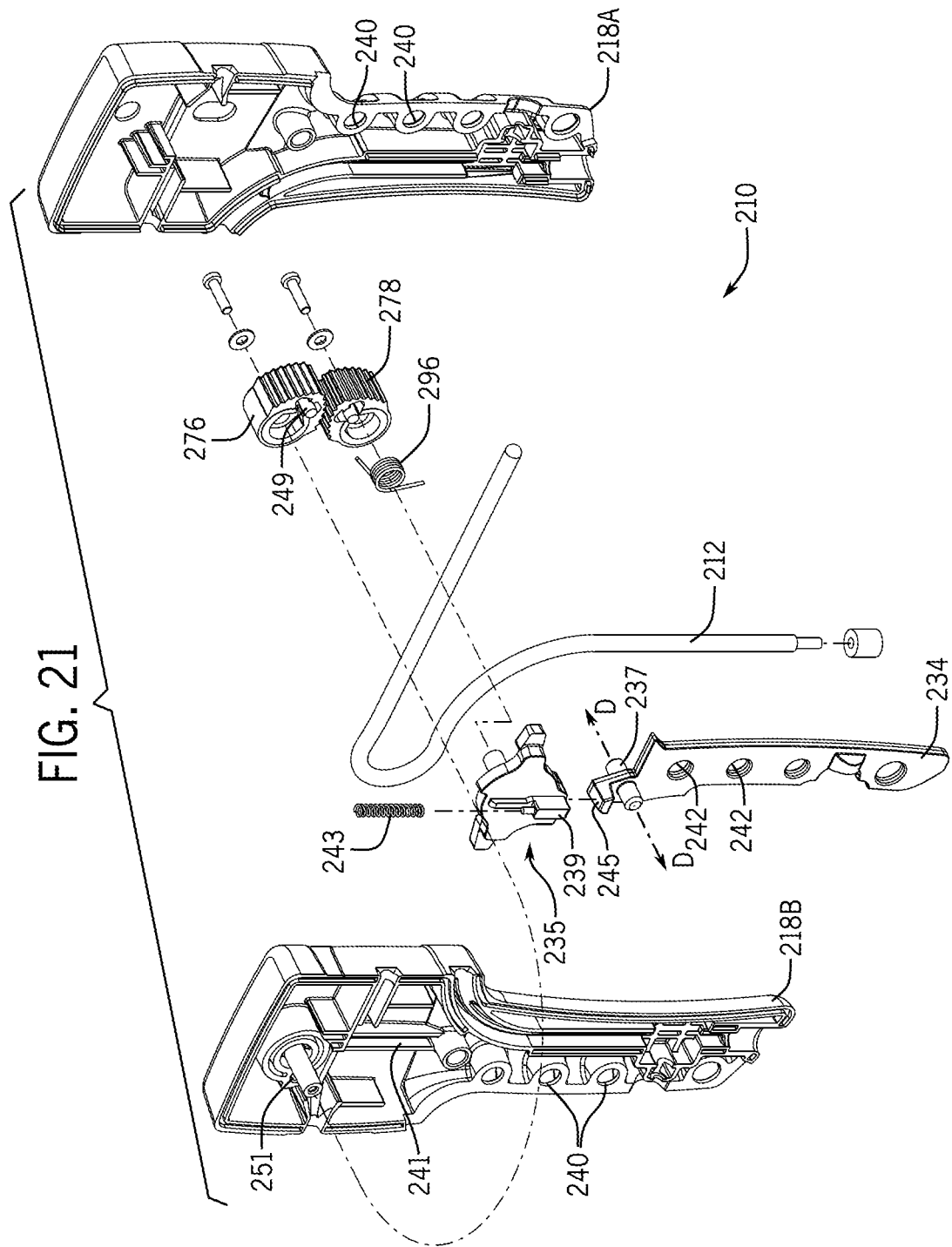
FIG. 21 is another exploded view of the cable lockout device of FIG. 15 showing some of the features from the opposing side.
Figure 23:
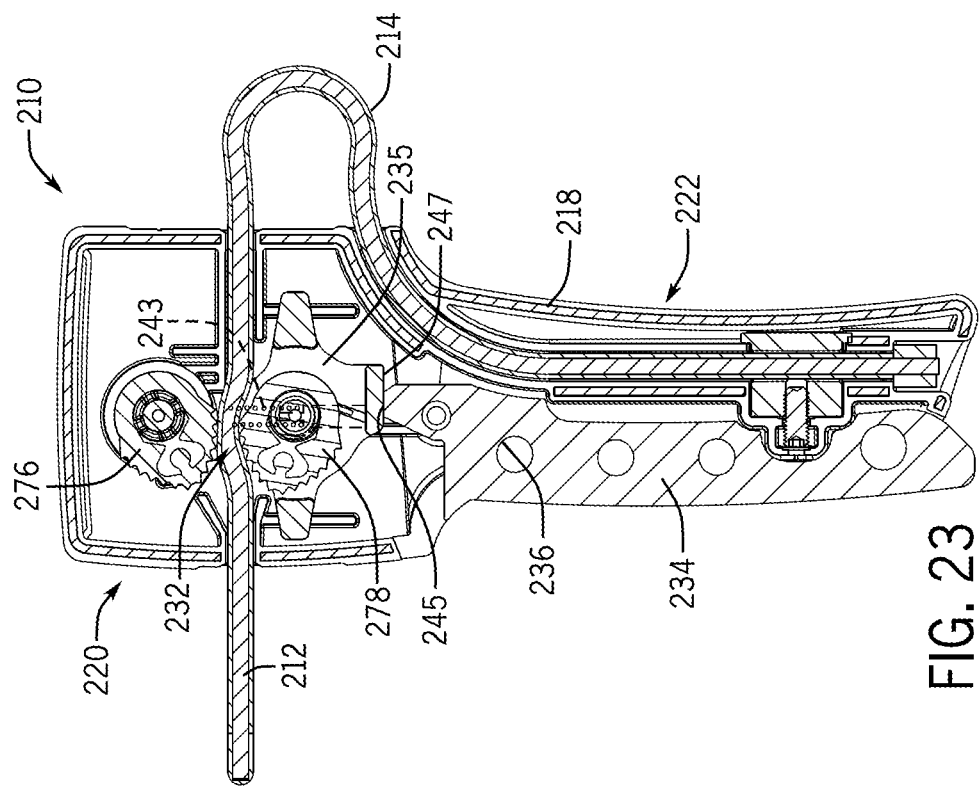
FIG. 23 is a left side cross-sectional view of the cable lockout device of FIG. 15 similar to FIG. 22, but in which the locking arm has been moved to the closed position to illustrate the cleats having been brought together at a cable gripping location via the movement of a locking slide arm.

A third difference between the cable lockout device 10 and the cable lockout device 210 relates to how the locking arm 234 is used to effectuate the second cam 278 being moved toward or away from the first cleat 276). With reference to FIGS. 20 through 23, it can be seen that, unlike the first embodiment in which the second cam 78 pivoted with the rotation of the locking arm 34, the actuation mechanism for the second cam 278 includes both a locking arm 234 and a locking slide arm 235. The locking slide arm 235 receives the second cam 278 on a post 237 about which the second cam 278 is rotationally biased by the biasing element 296. The locking slide arm 235 that supports the second cam 278 is arranged within the housing such that the locking slide arm 235 is moveable (more specifically, linearly translatable) towards and away from the cable gripping location 232. This path of movement of the locking slide arm 235 can be established by the interaction of the locking slide arm 235 with the housing 218A and/or 218B by having, for example, features such as a projection 239 that are received in a corresponding slot 241 in the housing 218B as is best shown in FIG. 21. As illustrated, there can also be another biasing member such as spring 243 that is received at the top side of the projection 239 (e.g., on a post) and in the slot 241 of the housing 218B with the spring 243 generally biasing the locking slide arm 235 away from the cable gripping location 232 as illustrated in FIG. 23.

Figure 22:
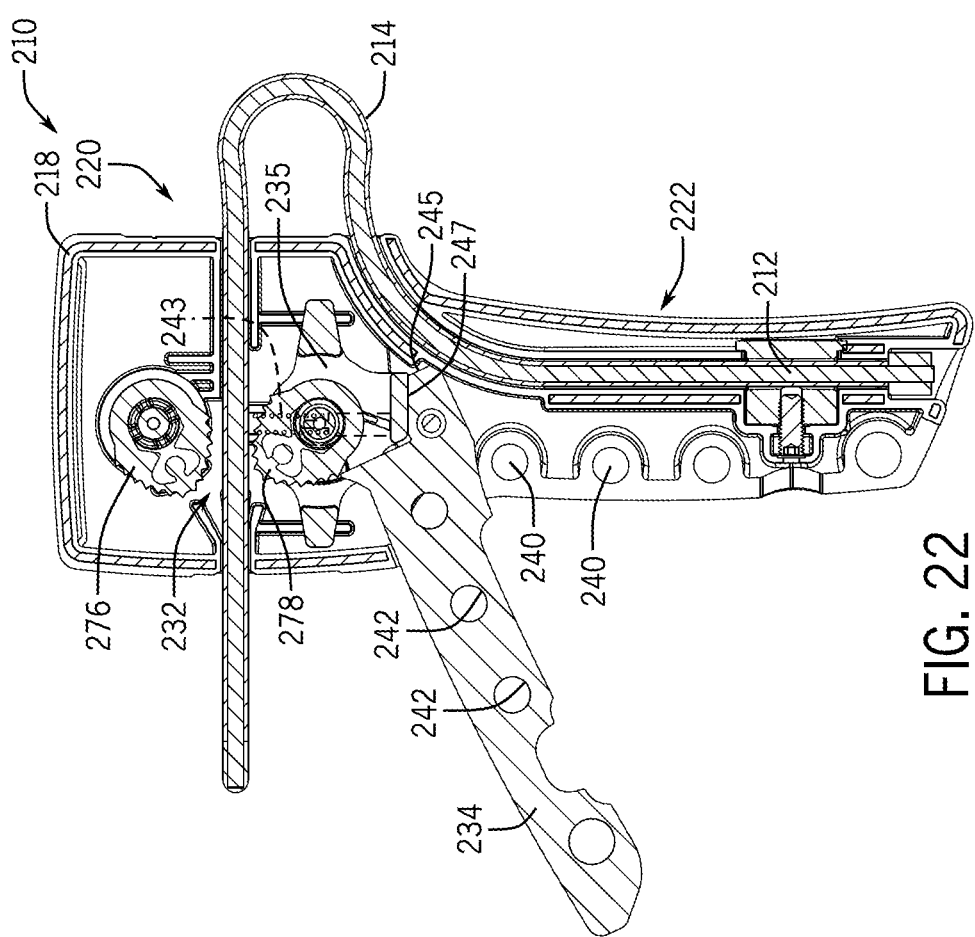
FIG. 22 is a left side cross-sectional view of the cable lockout device of FIG. 15, except in which the locking arm is in the opened position with the cleats separated from one another.

In order to move the locking slide arm 235 to the closed or cable griping position, the locking arm 234 of the device 210 has a cam surface 245 that can engage an engagement surface 247 on the bottom of the locking slide arm 235 to shift the locking slide arm 235 upward against any biasing force provided by the spring 243. The cam surface 245 and the rotational axis D-D of the locking arm 234 are positioned such that, when the locking arm 234 is in the open position (as best illustrated in FIG. 22) the locking slide arm 235 is positioned and moved away from the cable gripping location 232 by the biasing force of the spring 243. Then, when the locking arm 234 is rotated to the closed position as illustrated in FIG. 23, the cam surface 245 pushes the locking slide arm 235 upward into the cable gripping location 232 against the biasing force and so as to bring the first cleat 276 and second cams 278 together. Thus, it can be seen that the single pivoting arm design of the first embodiment is replaced in the second embodiment with a pivoting arm plus translational sliding arm design.

Still another difference between the cable lockout device 10 and the cable lockout device 210, is that in the cable lockout device 210, the first cleat 276 (previously cam) is no longer rotatable about an axis as was the first cam 76 in the device 10. Instead this first cleat 276 is fixed in place rotationally relative to the housing. This can be achieved, for example, by having a post 249 and hole 251 on part of the cleat 276 and housing 218B, for example, that establish and maintain the rotation position of the first cleat 276.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A cable lockout device comprising:
 a cable;
 a housing receiving the cable in which the cable forms a loop external to the housing, the housing having a passageway extending therethrough through which the cable extends and having a cable gripping location positioned along the passageway;
 a first cleat supported by the housing at the cable gripping location and having a first cleat axis that is fixed with respect to the housing;
 a locking arm rotationally coupled to the housing about a locking arm rotational axis and movable between an open position and a closed position in which, in the closed position, the locking arm is lockable relative to the housing to prevent movement of the locking arm back to the opened position without first unlocking the locking arm relative to the housing, further in which the locking arm actuates a second cleat that is a cam having a second cleat rotational axis spaced from the locking arm rotational axis and the second cleat rotational axis being movable with respect to the housing by virtue of a movement of the locking arm, the second cleat being brought towards the first cleat at the cable gripping location when the locking arm is moved to the closed position of the locking arm and moved away from the first cleat at the cable gripping location in the opened position of the locking arm.

2. The cable lockout device of claim 1, wherein the housing includes a plurality of housing locking openings and the locking arm includes a plurality of arm locking openings, the plurality of housing locking openings and the plurality of arm locking openings being aligned with one another in the closed position of the locking arm relative to the housing.

3. The cable lockout device of claim 2, wherein the plurality of housing locking openings and the plurality of arm locking openings are sized to receive shackles of padlocks therethrough to lock locking arm in the closed position.

4. The cable lockout device of claim 1, wherein the second cleat is rotationally biased about the second rotational axis and each of the first cleat and the second cleat include gripping teeth such that, in the closed position of the locking arm, the cable is gripped by the first cleat and the second cleat in the cable gripping location and is prevented from being pulled in a direction that would enlarge the loop external to the housing.

5. The cable lockout device of claim 4, wherein, even when the locking arm is in the closed position, the cable is able to be pulled through the cable gripping location in a direction that would decrease a size of the loop external to the housing.

6. The cable lockout device of claim 1, further comprising a cable attaching mechanism within the housing configured to clamp down on a fixed end of the cable in the housing.

7. The cable lockout device of claim 6, wherein the cable attaching mechanism is received in the housing and includes a fixed plate and a clamping plate that can be brought together by tightening a screw to clamp down on the cable.

8. The cable lockout device of claim 6, wherein, in the closed position the locking arm, the cable attaching mechanism is not accessible and cannot be operated to release the fixed end of the cable in the housing.

9. The cable lockout device of claim 6, wherein the cable attaching mechanism is received in the housing and includes:
   a clamp block secured in the housing, the clamp block including a cable passage running through the clamp block and a threaded passage running perpendicular and intersecting with the cable passage; and
   a set screw received in threaded passage of the clamp block in which the set screw is able to be advanced or withdrawn along the threaded passage to selectively bring a cup point end of the set screw in to engagement with the cable in the cable passage of the clamp block to secure the cable in place or to release the cable from the clamp block.

10. The cable lockout device of claim 1, further comprising a locking arm release control which releasably retains the locking arm in the closed position.

11. The cable lockout device of claim 10, in which the locking arm release control is supported by the housing and includes an engagement feature moveable between a retention position and a release position and further includes a biasing element biasing the engagement feature to the retention position but against which the engagement feature is movable to be placed in the release position, wherein the engagement feature is structured to selectively engage a corresponding engagement feature on the locking arm when the locking arm is in the closed position to retain the locking arm in the closed position and wherein, when engaged, the engagement feature supported by the housing and the corresponding engagement feature on the locking arm are disengageable from one another by actuation of the engagement feature from the retention position to the release position.

12. The cable lockout device of claim 11, wherein at least one of the engagement feature supported by the housing and the corresponding engagement feature on the locking arm include an angled surface such that, as the locking arm is moved from the opened position to the closed position, the engagement feature supported by the housing and the corresponding engagement feature on the locking arm contact one another at the angled surface to displace the engagement feature from the retention position toward the release position against the biasing element until the locking arm is in the closed position, at which point the engagement feature returns to the retention position and the engagement feature and the corresponding engagement feature engage with one another.

13. The cable lockout device of claim 1, wherein the housing comprises a head and a handle.

14. The cable lockout device of claim 13, wherein the head has the cable gripping location positioned therein and the locking arm is received in the handle when the locking arm is moved to the closed position.

15. The cable lockout device of claim 1, wherein the first cleat axis is a first cleat rotational axis of the first cleat, wherein the first cleat rotational axis and the second cleat rotational axis are parallel with one another, and wherein the first cleat and second cleat are rotationally biased in opposite directions about their respective axes to create a pinching action for the cable therebetween.

16. A cable lockout device comprising:
   a cable;
   a housing receiving the cable in which the cable forms a loop external to the housing, the housing having a passageway extending therethrough through which the cable extends and having a cable gripping location positioned along the passageway;
   a first cleat supported by the housing at the cable gripping location and having a first cleat axis that is fixed with respect to the housing, wherein the first cleat is fixed with respect to the housing such that the first cleat does not pivot relative to the housing;
   a locking arm rotationally coupled to the housing about a locking arm rotational axis and movable between an open position and a closed position in which, in the closed position, the locking arm is lockable relative to the housing to prevent movement of the locking arm back to the opened position without first unlocking the locking arm relative to the housing, further in which the locking arm actuates a second cleat that is a cam having a second cleat rotational axis spaced from the locking arm rotational axis and which is movable with respect to the housing by virtue of a movement of the locking arm, the second cleat being brought towards the first cleat at the cable gripping location when the locking arm is moved to the closed position of the locking arm and moved away from the first cleat at the cable gripping location in the opened position of the locking arm.

17. A cable lockout device comprising:
   a cable;
   a housing receiving the cable in which the cable forms a loop external to the housing, the housing having a passageway extending therethrough through which the cable extends and having a cable gripping location positioned along the passageway;

a first cleat supported by the housing at the cable gripping location and having a first cleat axis that is fixed with respect to the housing;

a locking arm rotationally coupled to the housing about a locking arm rotational axis and movable between an open position and a closed position in which, in the closed position, the locking arm is lockable relative to the housing to prevent movement of the locking arm back to the opened position without first unlocking the locking arm relative to the housing, further in which the locking arm actuates a second cleat that is a cam having a second cleat rotational axis spaced from the locking arm rotational axis and which is movable with respect to the housing by virtue of a movement of the locking arm, the second cleat being brought towards the first cleat at the cable gripping location when the locking arm is moved to the closed position of the locking arm and moved away from the first cleat at the cable gripping location in the opened position of the locking arm; and a locking slide arm to which the second cleat is attached, wherein the locking slide arm is movable toward and away from the cable gripping location positioned along the passageway by engagement of the locking slide arm with the locking arm.

18. The cable lockout device of claim 17, wherein the locking slide arm is linearly translatable toward and away from the cable gripping location positioned along the passageway.

19. The cable lockout device of claim 17, wherein the locking slide arm is biased away from the cable gripping location and, when the locking arm is in the closed position, the engagement of the locking arm with the locking slide arm moves the locking slide arm toward the cable gripping location overcoming any biasing force.

20. The cable arm lockout device of claim 19, wherein the locking arm has an engagement surface that engages the locking slide arm to push the locking slide arm between a disengaged cleat position and an engaged cleat position.

* * * * *

UNITED STATES PATENT AND TRADEMARK OFFICE
CERTIFICATE OF CORRECTION

PATENT NO. : 12,044,040 B2
APPLICATION NO. : 17/696449
DATED : July 23, 2024
INVENTOR(S) : Andrew N. Enger et al.

It is certified that error appears in the above-identified patent and that said Letters Patent is hereby corrected as shown below:

In the Specification

Column 7, Line 8, "openings (seen" should be --openings 42 (seen--.

Signed and Sealed this
Eighth Day of October, 2024

Katherine Kelly Vidal
*Director of the United States Patent and Trademark Office*